US012786798B2

(12) United States Patent
Yu et al.

(10) Patent No.: US 12,786,798 B2
(45) Date of Patent: Nov. 3, 2026

(54) TRAFFIC FLOW PROCESSING METHOD, APPARATUS, AND SYSTEM

(71) Applicant: HUAWEI TECHNOLOGIES CO., LTD., Shenzhen (CN)

(72) Inventors: Youyang Yu, Shanghai (CN); Shufeng Shi, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 318 days.

(21) Appl. No.: 18/474,634

(22) Filed: Sep. 26, 2023

(65) Prior Publication Data

US 2024/0015593 A1 Jan. 11, 2024

Related U.S. Application Data

(63) Continuation of application No. PCT/CN2021/135508, filed on Dec. 3, 2021.

(30) Foreign Application Priority Data

Mar. 31, 2021 (CN) ........................ 202110352126.5

(51) Int. Cl.
*H04W 28/12* (2009.01)
*H04W 72/566* (2023.01)

(52) U.S. Cl.
CPC ......... *H04W 28/12* (2013.01); *H04W 72/569* (2023.01)

(58) Field of Classification Search
CPC ............................ H04W 28/12; H04W 72/569
See application file for complete search history.

(56) References Cited

U.S. PATENT DOCUMENTS

2018/0035443 A1* 2/2018 Koskinen .............. H04W 76/15
2018/0376530 A1* 12/2018 Fujishiro ............... H04W 88/06
2023/0056442 A1* 2/2023 Ly ......................... H04W 24/10
(Continued)

OTHER PUBLICATIONS

Google: "FS_ATSSS_Ph2: KI#1, New sol: UE assisted traffic steering mode", 3GPP Draft; S2-2005105, 3rd Generation Partnership Project (3GPP), Mobile Competence Centre; 650, Route Des Lucioles; F-06921 Sophia-Antipolis Cedex; France vol. SA WG2, No. Electronic Meeting; Aug. 19, 2020-Sep. 2, 2020 Aug. 13, 2020 (Aug. 13, 2020), XP051919979, total 4 pages.
(Continued)

*Primary Examiner* — Ajay Cattungal
(74) *Attorney, Agent, or Firm* — HAUPTMAN HAM, LLP

(57) ABSTRACT

A traffic flow processing method, and apparatus. A terminal device receives first policy information from a session management network element, wherein the first policy information includes a first processing method for an uplink traffic flow. In response to the terminal device meeting a first condition, a second processing method for the uplink traffic flow or a downlink traffic flow is determined. First notification information is sent to a user plane network element, wherein the first notification information is for notifying the user plane network element to determine a third processing method for the downlink traffic flow. After meeting the first condition, the terminal device sends the first notification information to the user plane network element, to assist the user plane network element in determining whether to update a steering mode of a corresponding traffic flow.

16 Claims, 6 Drawing Sheets

(56) References Cited

U.S. PATENT DOCUMENTS

| | | | | |
|---|---|---|---|---|
| 2023/0199560 | A1* | 6/2023 | Nuggehalli | H04W 24/10 455/450 |
| 2023/0413114 | A1* | 12/2023 | Ly | H04W 28/0215 |
| 2024/0015593 | A1* | 1/2024 | Yu | H04W 72/569 |
| 2024/0049100 | A1* | 2/2024 | Zhang | H04W 40/02 |
| 2024/0397381 | A1* | 11/2024 | Ly | H04W 28/0215 |

OTHER PUBLICATIONS

Extended European Search Report issued in corresponding European Application No. 21934631.9, dated Jul. 16, 2024, pp. 1-7.

* cited by examiner

TRAFFIC FLOW PROCESSING METHOD, APPARATUS, AND SYSTEM

CROSS-REFERENCE TO RELATED APPLICATIONS

This application is a continuation of International Patent Application No. PCT/CN2021/135508, filed on Dec. 3, 2021, which claims priority to Chinese Patent Application No. 202110352126.5, filed on Mar. 31, 2021. The disclosures of the aforementioned applications are hereby incorporated by reference in their entireties.

TECHNICAL FIELD

This application relates to the field of communication technologies, and in particular, to a traffic flow processing method, apparatus, and system.

BACKGROUND

With development of communication technologies, a terminal device usually implements handover or concurrency of a traffic flow between different access technologies or different access network devices by using a multi-access protocol data unit (PDU) session. In a scenario in which a traffic flow is handover or concurrent between a plurality of access technologies, routing is performed or a steering ratio is adjusted based on a link status. Therefore, a user plane network element, for example, a UPF, learns about a link status in real time, and adjust a steering mode in a timely manner.

However, in a scenario of a user equipment (UE) assistance steering mode (to be specific, a terminal device performs autonomous steering based on a current status, instead of using a steering mode allocated by a network side), how to process a traffic flow is not disclosed in a conventional technology.

SUMMARY

Embodiments described herein provide a traffic flow processing method, apparatus, and system in a scenario of a user equipment-assistance steering mode.

According to a first aspect, at least one embodiment provides a traffic flow processing method. The method includes:

A terminal device receives first policy information from a session management network element, where the first policy information includes a first processing method for an uplink traffic flow; in response to the terminal device meeting a first condition, the terminal device determines a second processing method for the uplink traffic flow; and the terminal device sends first notification information to a user plane network element, where the first notification information is for notifying the user plane network element to determine a processing method for a downlink traffic flow corresponding to the uplink traffic flow.

Based on the foregoing solution, in at least one embodiment, after the terminal device meets the first condition and enters an assistance steering mode (that is, after a corresponding traffic flow is processed by using the second processing method), the terminal device sends the first notification information to the user plane network element, to assist the user plane network element in determining whether to update a steering mode of the corresponding downlink traffic flow, and determining a downlink steering policy based on a request of the terminal device (that is, based on content of the first notification information). This effectively prevents the user plane network element from blindly determining the downlink steering policy in response to information being insufficient, so that the terminal device and the user plane network element have better mutual coordination and stronger adaptability in response to processing a traffic flow.

In at least one embodiment, the first policy information further includes first indication information, and the first indication information indicates that the terminal device is capable of determining a processing method for the uplink traffic flow.

Based on the foregoing solution, in at least one embodiment, in response to the first policy information further including the first indication information, the terminal device performs the assistance steering mode.

In at least one embodiment, the first notification information includes: reason information based on which the terminal device determines to process the uplink traffic flow by using the second processing method; and/or first duration information in which the terminal device determines that the second processing method is valid.

Based on the foregoing solution, in at least one embodiment, in response to the first notification information including the reason information based on which the terminal device processes the uplink traffic flow by using the second processing method, the user plane network element that receives the first notification information leans of a reason why the terminal device processes the uplink traffic flow by using the second processing method, to better determine content of a third processing method performed by the user plane network element, even time and/or duration for performing traffic flow processing based on the third processing method. And/or, in response to the first notification information including the first duration information in which the terminal device uses the second processing method, the user plane network element that receives the first notification information leans of time information in which the terminal device processes the uplink traffic flow by using the second processing method, to better determine time and/or duration for performing the third processing method by the user plane network element.

In at least one embodiment, the first notification information further includes: information about the second processing method. Based on the foregoing solution, in at least one embodiment, in response to the first notification information including the information about the second processing method, the user plane network element that receives the first notification information learns of content of the second processing method, to better determine the content of the third processing method performed by the user plane network element.

In at least one embodiment, the information about the second processing method includes: description information and steering information of the uplink traffic flow corresponding to the downlink traffic flow; or flow description information and steering information of the downlink traffic flow.

The downlink traffic flow corresponding to the uplink traffic flow is a traffic flow formed by exchanging source and destination IP addresses. For example, a downlink traffic flow formed by exchanging source and destination IP addresses is a downlink traffic flow corresponding to an uplink flow of the source and destination IP addresses. Alternatively, the downlink traffic flow corresponding to the uplink traffic flow is a downlink traffic flow that belongs to a same QoS flow as the uplink traffic flow. In at least one embodiment, the method further includes: The terminal device receives second notification information from the user plane network element, where the second notification information includes second indication information, and the second indication information indicates whether the user plane network element changes the processing method for the downlink traffic flow.

Based on the foregoing solution, in at least one embodiment, the terminal device determines, based on the second notification information from the user plane network element, whether the user plane network element cooperates in changing the traffic flow processing method, for example, determine whether the user plane network element agrees to enter the assistance steering mode. This has stronger adaptability.

In at least one embodiment, in response to the second indication information indicating that the user plane network element does not change the processing method for the downlink traffic flow, the second notification message further includes: second duration information in which the processing method for the downlink traffic flow remains unchanged.

In at least one embodiment, the method further includes: The terminal device skips sending the first notification information to the user plane network element within time specified by the second duration information.

Based on the foregoing solution, in at least one embodiment, the terminal device receives the duration information that is in the second notification information and that indicates not to send the first notification information to the user plane network element. This effectively avoids a problem that the terminal device keeps sending the first notification information to the user plane network element after the user plane network element refuses to cooperate with the terminal device to use a same steering mode, thereby reducing signaling overheads.

In at least one embodiment, the method further includes: In response to the terminal device meeting a second condition, the terminal device determines to process the uplink traffic flow by using the first processing method.

Based on the foregoing solution, in at least one embodiment, after meeting the second condition, the terminal device determines to process the uplink traffic flow by using the first processing method. In other words, after meeting the second condition, the terminal device resumes a primary steering mode. In at least one embodiment, the method further includes: The terminal device sends third notification information to the user plane network element, to notify that the terminal device processes the uplink traffic flow by using the first processing method.

Based on the foregoing solution, in at least one embodiment, after the terminal device meets the second condition and resumes the primary steering mode, the terminal device sends the third notification information to the user plane network element. In this way, after receiving the third notification information, the user plane network element resumes the first processing method to process the uplink traffic flow. This provides a solution to supporting the user plane network element in collaboration with the terminal device to resume the primary steering mode to perform downlink traffic flow steering, and has stronger adaptability.

According to a second aspect, at least one embodiment provides a traffic flow processing method. The method includes:

A user plane network element receives second policy information from a session management network element, where the second policy information includes a fourth processing method for a downlink traffic flow of a terminal device; the user plane network element processes the downlink traffic flow by using the fourth processing method; the user plane network element receives first notification information from the terminal device, where the first notification information is for notifying the user plane network element to determine a processing method for the downlink traffic flow; and the user plane network element determines, based on the first notification information, to process the downlink traffic flow by using a third processing method.

Based on the foregoing solution, in at least one embodiment, the user plane network element is assistance, based on the first notification information sent by the terminal device, in determining whether to update a steering mode of the corresponding downlink traffic flow, and determining a downlink steering policy based on a request of the terminal device (that is, based on content of the first notification information). This effectively prevents the user plane network element from blindly determining the downlink steering policy in response to information being insufficient, so that the terminal device and the user plane network element have better mutual coordination and stronger adaptability in response to processing a traffic flow.

In at least one embodiment, the second policy information further includes second indication information, and the second indication information indicates that the user plane network element is capable of modifying the processing method for the downlink traffic flow.

Based on the foregoing solution, in at least one embodiment, in response to the second policy information further includes the second indication information, the user plane network element performs the assistance steering mode.

In at least one embodiment, the first notification information includes: reason information based on which the terminal device determines to process an uplink traffic flow by using a second processing method.

Based on the foregoing solution, in at least one embodiment, in response to the first notification information including the reason information based on which the terminal device processes the uplink traffic flow by using the second processing method, the user plane network element that receives the first notification information leans of a reason why the terminal device processes the uplink traffic flow by using the second processing method, to better determine content of a third processing method performed by the user plane network element, even time and/or duration for performing traffic flow processing based on the third processing method.

In at least one embodiment, the user plane network element determines the third processing method based on the reason information and the second indication information.

In at least one embodiment, the user plane network element determines the third processing method based on the reason information and a local policy of the user plane network element.

In at least one embodiment, the user plane network element determines the processing method for the downlink traffic flow based on the reason information, the second indication information, and a local policy of the user plane network element.

In at least one embodiment, the first notification information further includes: description information and steering information of the uplink traffic flow corresponding to the downlink traffic flow; or flow description information and steering information of the downlink traffic flow.

The downlink traffic flow corresponding to the uplink traffic flow is a traffic flow formed by exchanging source and destination IP addresses. For example, a downlink traffic flow formed by exchanging source and destination IP addresses is a downlink traffic flow corresponding to an uplink flow of the source and destination IP addresses. Alternatively, the downlink traffic flow corresponding to the uplink traffic flow is a downlink traffic flow that belongs to a same QoS flow as the uplink traffic flow.

Based on the foregoing solution, in at least one embodiment, in response to the first notification information includes the description information and the steering information of the uplink traffic flow corresponding to the downlink traffic flow or the flow description information and the steering information of the downlink traffic flow, the user plane network element that receives the first notification information leans of content of the second processing method, to better determine the content of the third processing method performed by the user plane network element.

In at least one embodiment, the user plane network element determines the processing method for the downlink traffic flow based on the description information and the steering information of the uplink traffic flow or the flow description information and the steering information of the downlink traffic flow.

In at least one embodiment, the user plane network element determines the third processing method based on the description information and the steering information of the uplink or downlink traffic flow.

In at least one embodiment, in response to the description information included in the first notification information being the downlink traffic flow, the user plane network element directly determines the downlink traffic flow based on the description information.

In at least one embodiment, in response to the description information included in the first notification information being the uplink traffic flow corresponding to the downlink traffic flow, the user plane network element maps the description information of the uplink traffic flow into the description information of the downlink traffic flow, and determines the downlink traffic flow based on the description information of the downlink traffic flow.

In at least one embodiment, a priority of the third processing method is higher than that of the fourth processing method.

In at least one embodiment, the method further includes: determining second duration information for using the third processing method.

In at least one embodiment, the first notification information further includes: first duration information in which the terminal device determines that the second processing method is valid. In response to the first notification information including the first duration information in which the terminal device uses the second processing method, the user plane network element that receives the first notification information leans of time information in which the terminal device processes the uplink traffic flow by using the second processing method, to better determine time and/or duration for performing the third processing method by the user plane network element.

In at least one embodiment, the second duration information is determined based on the first duration information.

In at least one embodiment, the user plane network element sends second notification information to the terminal device, where the second notification information includes second indication information, and the second indication information indicates whether the user plane network element changes the processing method for the downlink traffic flow.

Based on the foregoing solution, in at least one embodiment, the terminal device determines, based on the second notification information from the user plane network element, whether the user plane network element cooperates in changing the traffic flow processing method, for example, determine whether the user plane network element agrees to enter the assistance steering mode. This has stronger adaptability.

In at least one embodiment, in response to the second indication information indicating that the user plane network element does not change the processing method for the downlink traffic flow, the second notification message further includes: second duration information in which the processing method for the downlink traffic flow remains unchanged.

In at least one embodiment, the method further includes: The user plane network element skips receiving, within time specified by the second duration information, the first notification information sent by the terminal device.

Based on the foregoing solution, in at least one embodiment, the terminal device receives the duration information that is in the second notification information and that indicates not to send the first notification information to the user plane network element. This effectively avoids a problem that the terminal device keeps sending the first notification information to the user plane network element after the user plane network element refuses to cooperate with the terminal device to use a same steering mode, thereby reducing signaling overheads.

In at least one embodiment, the method further includes: The user plane network element receives third notification information from the terminal device, where the third notification information is for notifying that the terminal device processes the traffic flow by using a first processing method.

Based on the foregoing solution, in at least one embodiment, after the terminal device meets the second condition and resumes the primary steering mode, the terminal device sends the third notification information to the user plane network element. In this way, after receiving the third notification information, the user plane network element resumes the first processing method to process the uplink traffic flow. This provides a solution to supporting the user plane network element in collaboration with the terminal device to resume the primary steering mode to perform downlink traffic flow steering, and has stronger adaptability.

In at least one embodiment, the method further includes: The user plane network element processes the traffic flow by using the fourth processing method.

According to a third aspect, at least one embodiment provides a traffic flow processing method. The method includes:

A terminal device receives first policy information from a session management network element, where the first policy information includes a first processing method for an uplink traffic flow; after the terminal device meets a first condition, the terminal device determines a second processing method for the uplink traffic flow or a downlink traffic flow, and processes the uplink traffic flow by using the second processing method; the terminal device determines that a second condition is met, and resumes processing the uplink traffic flow by using the first processing method; and the terminal device sends first notification information to a user plane network element, where the first notification information is for notifying that the terminal device processes the traffic flow by using the first processing method.

Based on the foregoing solution, in at least one embodiment, after the terminal device meets the second condition and resumes a primary steering mode, the terminal device sends the first notification information to the user plane network element. In this way, after receiving the first notification information, the user plane network element resumes the first processing method to process the uplink traffic flow. This provides a solution to supporting the user plane network element in collaboration with the terminal device to resume the primary steering mode to perform downlink traffic flow steering, and has stronger adaptability.

In at least one embodiment, the first policy information further includes first indication information, and the first indication information indicates that the terminal device is capable of determining a processing method for the uplink traffic flow.

In at least one embodiment, the first notification information includes: reason information based on which the terminal device resumes processing the uplink traffic flow by using the first processing method.

In at least one embodiment, the first notification information further includes: information about the first processing method.

In at least one embodiment, the method further includes: The terminal device receives second notification information from the user plane network element, where the second notification information includes third indication information, and the third indication information indicates whether the user plane network element changes a processing method for the downlink traffic flow.

According to a fourth aspect, at least one embodiment provides a traffic flow processing method. The method includes:

A user plane network element receives second policy information from a session management network element, where the second policy information includes a third processing method for a downlink traffic flow of a terminal device; the user plane network element processes the downlink traffic flow by using a fourth processing method; the user plane network element receives first notification information from the terminal device, where the first notification information is for notifying that the terminal device resumes processing the traffic flow by using a first processing method; and the user plane network element resumes, based on the first notification information, processing the downlink traffic flow by using the third processing method.

Based on the foregoing solution, in at least one embodiment, after the terminal device meets a second condition and resumes a primary steering mode, the terminal device sends the third notification information to the user plane network element. In this way, after receiving the third notification information, the user plane network element resumes the first processing method to process the uplink traffic flow. This provides a solution to supporting the user plane network element in collaboration with the terminal device to resume the primary steering mode to perform downlink traffic flow steering, and has stronger adaptability.

In at least one embodiment, the second policy information further includes second indication information, and the second indication information indicates that the user plane network element is capable of determining a processing method for the downlink traffic flow.

In at least one embodiment, the first notification information includes: reason information based on which the terminal device resumes processing the uplink traffic flow by using the first processing method.

In at least one embodiment, before the user plane network element processes the downlink traffic flow by using the fourth processing method, the user plane network element receives third notification information from the terminal device, where the third notification information is for notifying the user plane network element to determine the fourth processing method for the downlink traffic flow; and the user plane network element determines the fourth processing method based on the third notification information.

In at least one embodiment, the third notification information includes: reason information based on which the terminal device determines to process the uplink traffic flow or the downlink traffic flow by using a second processing method.

In at least one embodiment, the user plane network element determines the fourth processing method based on the second indication information and the reason information based on which the terminal device determines to process the uplink traffic flow or the downlink traffic flow by using the second processing method.

In at least one embodiment, the user plane network element determines the fourth processing method based on a local policy of the user plane network element and the reason information based on which the terminal device determines to process the uplink traffic flow or the downlink traffic flow by using the second processing method.

In at least one embodiment, the user plane network element determines the fourth processing method based on the second indication information, a local policy of the user plane network element, and the reason information based on which the terminal device determines to process the uplink traffic flow or the downlink traffic flow by using the second processing method.

In at least one embodiment, the first notification information and/or the third notification information further includes: description information and steering information of the uplink traffic flow corresponding to the downlink traffic flow.

In at least one embodiment, the first notification information and/or the third notification information further includes: description information and steering information of the downlink traffic flow.

In at least one embodiment, a priority of the fourth processing method is higher than that of the third processing method.

In at least one embodiment, the third notification information further includes: first duration information in which the terminal device determines that the second processing method is valid.

In at least one embodiment, the method further includes: determining second duration information for using the fourth processing method.

In at least one embodiment, the second duration information is determined based on the first duration information.

In at least one embodiment, the user plane network element sends second notification information to the terminal device, where the second notification information includes third indication information, and the third indication information indicates whether the user plane network element changes the processing method for the downlink traffic flow.

In at least one embodiment, in response to the third indication information indicating that the user plane network element does not change the processing method for the downlink traffic flow, the second notification message further includes: second duration information in which the processing method for the downlink traffic flow remains unchanged.

In at least one embodiment, the method further includes: The user plane network element skips receiving, within time specified by the second duration information, the third notification information sent by the terminal device.

According to a fifth aspect, at least one embodiment provides a traffic flow processing apparatus. The apparatus is a terminal device, or is a chip used in the terminal device. The apparatus has a function of implementing any method in any one of the first aspect or the implementations of the first aspect. This function is implemented by using hardware, or is implemented by executing corresponding software by hardware. The hardware or the software includes one or more modules corresponding to the foregoing function.

According to a sixth aspect, at least one embodiment provides a traffic flow processing apparatus. The apparatus is a user plane network element, or is a chip used in the user plane network element. The apparatus has a function of implementing any method in any one of the second aspect or the implementations of the second aspect. This function is implemented by using hardware, or is implemented by executing corresponding software by hardware. The hardware or the software includes one or more modules corresponding to the foregoing function.

According to a seventh aspect, at least one embodiment provides a traffic flow processing apparatus. The apparatus is a terminal device, or is a chip used in the terminal device. The apparatus has a function of implementing any method in any one of the third aspect or the implementations of the third aspect. This function is implemented by using hardware, or is implemented by executing corresponding software by hardware. The hardware or the software includes one or more modules corresponding to the foregoing function.

According to an eighth aspect, at least one embodiment provides a traffic flow processing apparatus. The apparatus is a user plane network element, or is a chip used in the user plane network element. The apparatus has a function of implementing any method in any one of the fourth aspect or the implementations of the fourth aspect. This function is implemented by using hardware, or is implemented by executing corresponding software by hardware. The hardware or the software includes one or more modules corresponding to the foregoing function.

According to a ninth aspect, at least one embodiment further provides a computer-readable storage medium. The computer-readable storage medium stores instructions. In response to the instructions being run on a computer, a processor is enabled to perform any method in any one of the first aspect to the fourth aspect or the implementations of the first aspect to the fourth aspect.

According to a tenth aspect, at least one embodiment further provides a computer program product. The computer product includes a computer program. In response to the computer program being run, a processor is enabled to perform any method in any one of the first aspect to the fourth aspect or the implementations of the first aspect to the fourth aspect.

According to an eleventh aspect, at least one embodiment further provides a chip system, including a processor and a memory. The memory is configured to store a computer program. The processor is configured to invoke the computer program from the memory and run the computer program, so that a device on which the chip system is installed performs any method in any one of the first aspect to the fourth aspect or the implementations of the first aspect to the fourth aspect.

According to a twelfth aspect, at least one embodiment further provides a traffic flow processing system, including a session management network element, a user plane network element, and the like.

The session management network element is configured to send policy information to the user plane network element, where the policy information includes a processing method for a downlink traffic flow of a terminal device.

The user plane network element is configured to: receive the policy information from the session management network element; process the downlink traffic flow by using a fourth processing method; receive first notification information from the terminal device, where the first notification information is for notifying the user plane network element to determine the processing method for the downlink traffic flow; and determine, based on the first notification information, to process the downlink traffic flow by using a third processing method.

DESCRIPTION OF EMBODIMENTS

To describe the technical solutions of at least one embodiment more clearly and completely, the following describes embodiments herein with reference to the accompanying drawings.

With development of communication technologies, a terminal device usually implements handover or concurrency of a traffic flow between different access technologies or different access network devices by using a multi-access protocol data unit (PDU) session.

Figure 1:
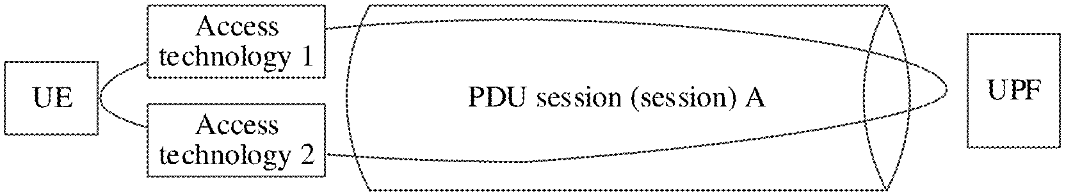
FIG. 1 is a schematic diagram of a scenario in which a traffic flow is transmitted between different access technologies or different access network devices in a conventional technology.

For example, as shown in FIG. 1, a PDU session A is first transmitted by using a first technology, and then the PDU session A is transmitted by using a second technology. Alternatively, the PDU session A is transmitted by using both a first technology and a second technology, to increase bandwidth. In at least one embodiment, content of the first technology and/or the second technology includes, but are/is not limited to, a 3GPP access technology, a non-3GPP access technology, an LTE access technology, a 5G RAN access technology, a trusted non-3GPP access technology, an untrusted non-3GPP access technology, a WLAN access technology, a fixed network access technology, and the like. For example, the first access technology is a 3GPP access technology, and the second access technology is a non-3GPP access technology. Alternatively, the first access technology is a 5G/NR access technology, and the second access technology is a WLAN access technology.

In a scenario in which a traffic flow is handover or is concurrent between a plurality of access technologies, route selection or steering ratio adjustment usually is to be performed based on a link status. Therefore, a user plane network element is to learn of a link status in real time, and adjust a steering mode in a timely manner.

However, in the scenario in which a traffic flow is handover or is concurrent between a plurality of access technologies, a terminal device usually performs autonomous steering based on a current status of the terminal device, instead of performing network side allocation. This is referred to as a user equipment-assistance steering mode. For example, in response to the terminal device having low power, the terminal device chooses to migrate all traffic flows to one access technology side for transmission, and then disable a signal on the other access side, to save power.

However, currently, in the user equipment-assistance steering mode, a specific behavior of the user plane network element after the terminal device enters the assistance steering mode is not disclosed. In addition, because adjustment of the steering mode entered by the terminal device is an autonomous behavior, the user plane network element cannot perform corresponding steering adjustment on a downlink traffic flow based on a request of the terminal device.

To resolve this problem, embodiments described herein provide a traffic flow steering method. The technical solutions in embodiments described herein is applied to various communication systems, for example, a long term evolution (LTE) system, an LTE frequency division duplex (FDD) system, an LTE time division duplex (TDD) system, a universal mobile telecommunication system (UMTS), a worldwide interoperability for microwave access (WIMAX) communication system, or a 5$^{th}$ generation (5G) system or new radio (NR), or is applied to a future communication system or another similar communication system, for example, a 6G system.

The 5G system (which is also referred to as a new radio system) is used as an example. For an existing traffic flow steering process, embodiments described herein provide a corresponding traffic steering solution to a problem that a user plane network element cannot perform corresponding steering adjustment on a downlink traffic flow based on a request of a terminal device, to effectively improve a traffic flow steering mechanism.

Figure 2:
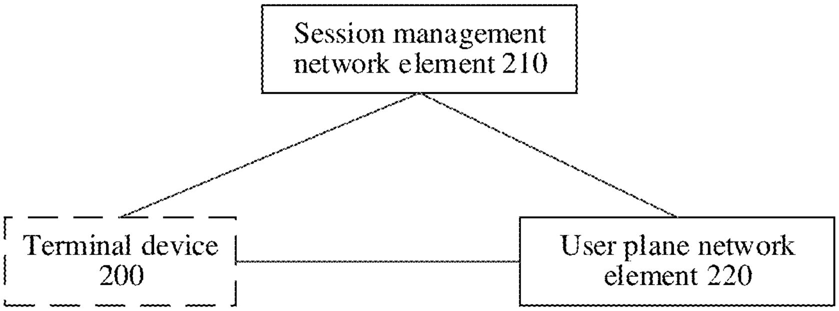
FIG. 2 is a schematic diagram of a first traffic flow processing system according to at least one embodiment.

For ease of understanding of embodiments described herein, a communication system shown in FIG. 2 is first used as an example to describe in detail the communication system to which at least one embodiment is applicable. As shown in FIG. 2, the communication system includes a terminal device 200, a session management network element 210, and a user plane network element 220. There is a plurality of terminal devices 200.

The terminal device 200 is a device that provides voice and/or data connectivity for a user, and is also referred to as user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device in at least one embodiment is a mobile phone, a tablet computer (Pad), a computer having a wireless transceiver function, a virtual reality (VR) terminal, an augmented reality (AR) terminal, a wireless terminal in industrial control a wireless terminal in self-driving, a wireless terminal in remote medical, a wireless terminal in a smart grid, a wireless terminal in transportation safety, a wireless terminal in a smart city, a wireless terminal in a smart home, or the like.

The session management network element 210 is mainly responsible for establishing a corresponding session connection on a network side in response to a user initiating a service, to provide a specific service for the user.

The session management network element 210 in at least one embodiment is an SMF, or is another network element that has a function of the session management network element in at least one embodiment. This is not limited herein.

For example, a data packet forwarding policy, a QoS policy, and the like are delivered to the user plane network element based on an interface between the SMF and the user plane network element.

The user plane network element 220 is mainly responsible for packet data packet forwarding, QoS control, charging information statistics collection, and the like.

The user plane network element in at least one embodiment is a UPF, or is another network element that has a function of the user plane network element in at least one embodiment. This is not limited herein.

In at least one embodiment, the terminal device is handed over from a 4G communication system to a 5G communication system, or is handed over from the 5G communication system to the 4G communication system. This is not specifically limited.

Further, in at least one embodiment, the communication system further includes another device, which is not specifically limited to the following content.

Figure 3:
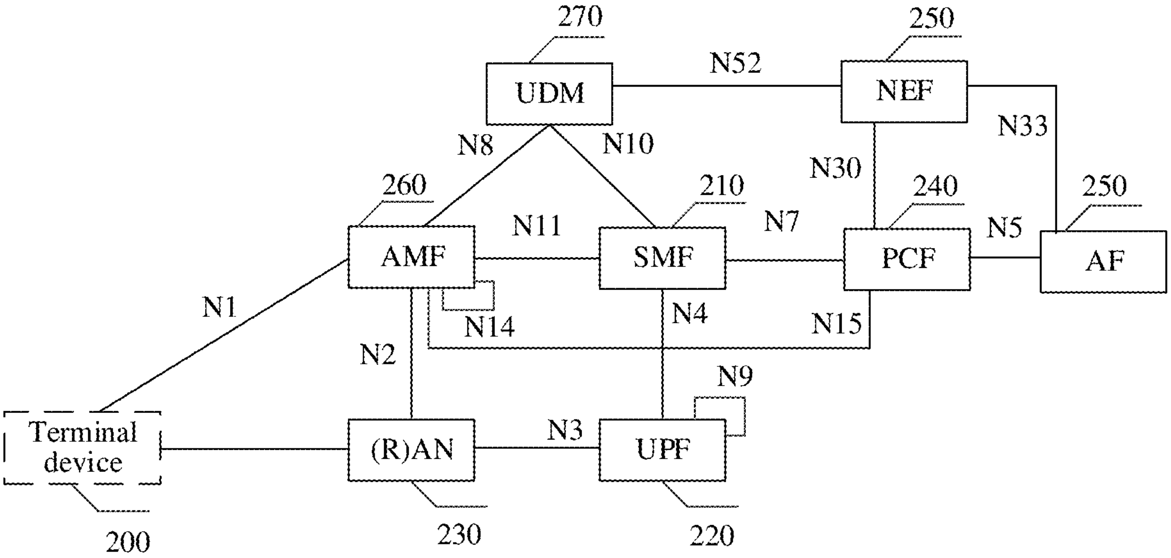
FIG. 3 is a schematic diagram of a second traffic flow processing system according to at least one embodiment.

For example, the communication system further includes a (radio) access network (®AN) network element 230, a policy control function (PCF) network element 240, and a network exposure function (NEF)/application function (AF) network element 250, an access and mobility management function (AMF) network element 260, a unified data management (UDM) network element 270, and the like shown in FIG. 3.

The RAN network element 230 is configured to provide a network access function for an authorized terminal device in a specific area, and is capable of using transmission tunnels of different quality of service based on a level of the terminal device, a service specification, and the like.

The RAN network element manages a radio resource, provide an access service for the terminal device, and further complete forwarding of a control signal and terminal device data between the terminal device and a core network. The RAN device in at least one embodiment is a device that provides a wireless communication function for the terminal device, and the RAN device is also referred to as an access network device. The RAN device in at least one embodiment includes but is not limited to: a next-generation NodeB (gNodeB, gNB) in 5G, an evolved NodeB (eNB), a radio network controller (RNC), a NodeB (NB), a base station controller BSC), a base transceiver station (BTS), a home base station (for example, a home evolved NodeB or a home NodeB, HNB), a baseband unit (BBU), a transmission reception point (TRP), a transmission point (TP), a mobile switching center, and the like.

The PCF network element 240 is mainly configured to generate a control policy based on request information of the AF, an operator policy, user subscription information, and the like, to control a network behavior; and deliver a control policy to a control plane network element for policy execution.

The NEF/AF network element 250 is mainly configured to initiate a network reservation request that carries traffic descriptor information (such as an IP 5-tuple and application IP) and a requested network resource (which is an identifier negotiated by the AF and an operator in advance, for example, single network slice selection assistance information (Single Network Slice Selection Assistance Information, S-NSSAI)).

The AMF network element 260 is mainly configured to perform mobility management in a mobile network, for example, user location update, user network registration, and user handover.

The UDM network element 270 is a network element that mainly manages subscription information of the terminal device.

In the system architecture shown in FIG. 3, names and functions of interfaces between network elements are as follows:

(1) N7 is an interface between the PCF and the SMF, and is configured to deliver a PDU session and a service data flow control policy.

(2) N15 is an interface between the PCF and the AMF, and is configured to deliver a control policy for terminal device mobility and network selection.

(3) N5 is an interface between the AF and the PCF and is configured to deliver an application service request (carrying a quality of service QoS specification of a service for bandwidth, a resource preemption priority, or the like) and report a network event (such as a type of radio access to a network by a user, and 3G and 4G access modes).

(4) N4 is an interface between the SMF and the user plane network element, and is configured to transfer information between a control plane and a user plane, including delivery of a forwarding rule, a QoS control rule, and a traffic statistics collection rule from the control plane to the user plane and reporting of user plane information (such as application information and usage monitoring information detected on the user plane).

(5) N11 is an interface between the SMF and the AMF, and is configured to: transfer user plane tunnel information between the RAN and the user plane network element, transfer a control message to be sent to the terminal device, transfer radio resource control information to be sent to the RAN, and so on.

(6) N2 is an interface between the AMF and the RAN, and is configured to: transfer radio bearer control information from a core network side to the RAN, and so on.

(7) N1 is an interface between the AMF and the terminal device, is independent of access, and is configured to transfer a QoS control rule to the terminal device, and so on.

A network architecture and a service scenario described in at least one embodiment are intended to describe the technical solutions in at least one embodiment more clearly, and do not constitute a limitation on the technical solutions provided in at least one embodiment. A person of ordinary skill in the art knows that: With evolution of the network architecture and emergence of new service scenarios, the technical solutions provided in at least one embodiment are also applicable to similar technical problems. FIG. 2 and FIG. 3 are merely simplified schematic diagrams of examples for ease of understanding. The communication system further includes another network device or further includes another terminal, which is not shown in FIG. 2 and FIG. 3.

"Network element" in at least one embodiment is also referred to as an entity, a device, an apparatus, a module, or the like. This is not particularly limited in at least one embodiment. In addition, in at least one embodiment, for ease of understanding and description, "network element" is omitted in some descriptions. For example, the UPF network element is referred to as a UPF for short. In this case, the "UPF network element" should be understood as a UPF or a UPF entity. Descriptions of a same or similar situation are omitted below. The foregoing network element or function is a network element in a hardware device, is a software function running on dedicated hardware, or is a virtualization function instantiated on a platform (for example, a cloud platform). In an optional implementation of at least one embodiment, the foregoing network element or function is implemented by one device, is jointly implemented by a plurality of devices, or is implemented by a functional module in one device. This is not specifically limited in at least one embodiment. Network elements with same or similar functions is disposed together.

For ease of understanding, the following further describes some terms in at least one embodiment.

(1) User equipment-assistance steering mode: In at least one embodiment, the assistance steering mode indicates that a terminal device performs autonomous steering based on an internal status, that is, the terminal device selects one or more transmission links for an uplink traffic flow.

(2) A downlink traffic flow corresponding to an uplink traffic flow is a traffic flow formed by exchanging source and destination IP addresses. For example, a downlink traffic flow formed by exchanging source and destination IP addresses is a downlink traffic flow corresponding to an uplink flow of the source and destination IP addresses. Alternatively, the downlink traffic flow corresponding to the uplink traffic flow is a downlink traffic flow that belongs to a same QoS flow as the uplink traffic flow.

In addition, in an optional implementation of at least one embodiment, in response to the terminal device performing the assistance steering mode, the terminal device notifies a user plane network element to keep a steering mode of the downlink traffic flow consistent with an uplink steering mode.

In addition, the terms "system" and "network" in at least one embodiment is used interchangeably. "At least one" means one or more, and "a plurality of" refers to two or more. The term "and/or" is an association relationship for describing associated objects and represents that three relationships exist. For example, A and/or B represent the following three cases: Only A exists, both A and B exist, and only B exists, where A and B is singular or plural. A character "/" generally indicates an "or" relationship between the associated objects. At least one (piece) of the following items or a similar expression thereof refers to any combination of these items, including a single item (piece) or any combination of plural (pieces) of items. For example, at least one of a, b, or c represent: a; b; c; a and b; a and c; b and c; or a, b, and c, where a, b, and c is one or more.

Unless otherwise specified, ordinal numbers such as "first" and "second" mentioned in at least one embodiment are used to distinguish a plurality of objects, and are not used to limit a sequence, a time sequence, a priority, or an importance degree of the plurality of objects. In addition, the terms "include" and "have" in at least one embodiment, the claims, and the accompanying drawings are not exclusive. For example, a process, a method, a system, a product, or a device that includes a series of steps or modules is not limited to the listed steps or modules, and further includes steps or modules that are not listed.

Figure 4:
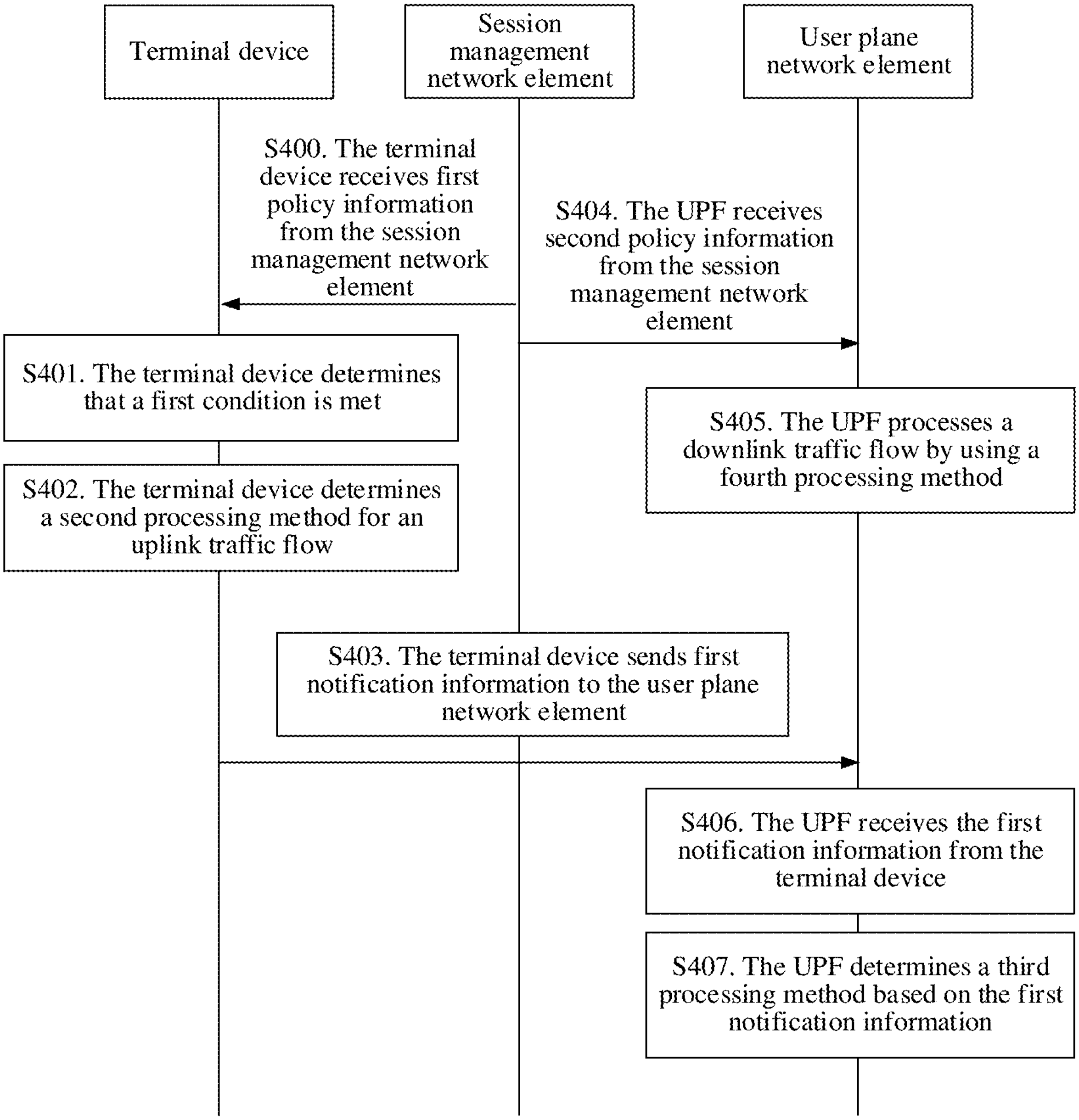
FIG. 4 is a schematic flowchart of a first traffic flow processing method according to at least one embodiment.

As shown in FIG. 4, steps of a traffic flow processing method provided in at least one embodiment are as follows:

S400. A terminal device receives first policy information from a session management network element, where the first policy information includes a first processing method for an uplink traffic flow.

In an optional implementation of at least one embodiment, the first processing method is understood as a primary steering mode in which the session management network element indicates the terminal device to perform traffic flow processing.

For example, a steering mode includes an active-standby mode, a smallest delay mode, a load-balancing mode, a priority-based mode, and the like.

In response to the first processing method being the active-standby mode, the session management network element indicates the terminal device to use the active-standby mode as the primary steering mode to perform traffic flow steering.

Further, the first policy information further includes first indication information, and the first indication information indicates that the terminal device is capable of determining a processing method for the uplink traffic flow.

S401. The terminal device determines that a first condition is met.

In an optional implementation of at least one embodiment, that the terminal device determines that the first condition is met is understood as: The terminal device determines to enter the assistance steering mode.

In at least one embodiment, the first condition is not limited to entering the assistance steering mode, meeting the assistance steering mode, or the like. Any steering mode applicable to at least one embodiment falls within the protection scope of at least one embodiment.

In an optional implementation of at least one embodiment, the first condition is an internal condition of the terminal device.

For example, the terminal device determines, based on a current status of the terminal device, whether the first condition is met, that is, determine whether to trigger the terminal device to enter the assistance steering mode.

Further, the terminal device determines, based on the current status of the terminal device, which traffic flows of the terminal device enter the assistance steering mode, that is, determine a target traffic flow that enters the assistance steering mode.

For example, in response to a battery level of the terminal device being lower than a battery level threshold, traffic flows 1 to 3 are triggered to enter the assistance steering mode. The battery level threshold is assumed to be 10%, and a current battery level of the terminal device is assumed to be 9%. The terminal device determines that the battery level of the terminal device is lower than the battery level threshold. Therefore, the terminal device triggers the traffic flows 1 to 3 to enter the assistance steering mode.

S402. The terminal device determines a second processing method for the uplink traffic flow or a downlink traffic flow.

In an optional implementation of at least one embodiment, that the terminal device determines the second processing method for the uplink traffic flow or the downlink traffic flow is understood as: The terminal device determines a steering solution in which the terminal device determines that the uplink traffic or the downlink traffic flow enters the assistance steering mode.

After the uplink traffic flow or the downlink traffic flow of the terminal device enters the assistance steering mode, the terminal device does not perform steering on the uplink traffic flow in the primary steering mode, but the terminal device determines a steering mode.

For example, the terminal device selects one access technology to transmit the uplink traffic flow, or transmits, based on a steering ratio determined by the terminal device, the uplink traffic flow using two access technologies.

Further, in at least one embodiment, in response to determining the second processing method for the uplink traffic flow or the downlink traffic flow, the terminal device is to determine, based on the first indication information in the first policy information, that the terminal device determines a processing method for the uplink traffic flow or the downlink traffic flow.

S403. The terminal device sends first notification information to a user plane network element, where the first notification information is for notifying the user plane network element to determine a third processing method for the downlink traffic flow corresponding to the uplink traffic flow.

The terminal device sends the first notification information to the user plane network element, to assist the user plane network element in determining whether to update a steering mode of a corresponding traffic flow.

In an optional implementation of at least one embodiment, the terminal device sends the first notification information to the user plane network element, to request the user plane network element to use a same steering mode as the terminal device for the downlink traffic flow.

The first notification information is a new message proposed in a process of a traffic flow steering method in at least one embodiment. Alternatively, the first notification information is an improvement on a request sent by the terminal device to the user plane network element. For example, the first notification information is a PMF request message.

The third processing method is consistent with the steering method requested by the terminal device, or is another steering method determined by the user plane network element based on an actual situation.

S404. The user plane network element receives second policy information from the session management network element, where the second policy information includes a fourth processing method for the downlink traffic flow of the terminal device.

In an optional implementation of at least one embodiment, the user plane network element searches, based on a description of the uplink traffic flow or the downlink traffic flow, for the second policy information corresponding to the downlink traffic flow. In response to the second policy information not including a second indication, the user plane network element processes a traffic flow based on the fourth processing method. Otherwise, the user plane network element determines, based on at least one of a cause value sent by the terminal device or a local policy, to process the traffic flow based on the third processing method or the fourth processing method. For example, in response to the second policy information including the second indication, the user plane network element determines the third processing method based on a flow description and steering information in the first notification message, and processes the downlink traffic flow based on the third processing method. In addition, the user plane network element sets a validity period for the third processing method. After a validity period expires, the user plane network element processes the downlink traffic flow based on the fourth processing method.

In an optional implementation of at least one embodiment, the fourth processing method is understood as a primary steering mode in which the session management network element indicates the user plane network element to perform traffic flow processing.

S405. The user plane network element processes the downlink traffic flow by using the fourth processing method.

S406. The user plane network element receives the first notification information from the terminal device.

S407. The user plane network element determines the third processing method based on the first notification information. In an optional implementation of at least one embodiment, the user plane network element determines the third processing method based on the first notification information and a current status of the user plane network element.

In an optional implementation of at least one embodiment, the user plane network element determines the third processing method based on the first notification information, the second policy information, and a current status of the user plane network element.

In response to the user plane network element using, based on the first notification information, the same steering mode as the terminal device for the downlink traffic flow, the third processing method is the second processing method. In response to the user plane network element determining, based on the first notification information, that the user plane network element does not use the same steering mode as the terminal device for the downlink traffic flow, the third processing method is the fourth processing method, or is another processing method determined based on an actual situation. This is not limited in at least one embodiment.

According to the foregoing method, in at least one embodiment, after the terminal device meets the first condition and enters the assistance steering mode (that is, after a corresponding traffic flow is processed by using the second processing method), the terminal device sends the first notification information to the user plane network element, to assist the user plane network element in determining whether to update a steering mode of the corresponding downlink traffic flow, and determining a downlink steering policy based on a request of the terminal device (that is, based on content of the first notification information). This effectively prevents the user plane network element from blindly determining the downlink steering policy in response to information being insufficient, so that the terminal device and the user plane network element have better mutual coordination and stronger adaptability in response to processing a traffic flow. The traffic flow steering steps in FIG. 4 constitute no limitation on at least one embodiment. For example, S404 and S405 and S400 to S403 are not performed in a particular sequence. S404 and S405 is performed before any step of S400 to S403. In addition, in a process of performing the traffic flow steering method in at least one embodiment, adaptive adjustment or deformation is performed on the foregoing steps based on an actual situation.

Further, in an optional implementation of at least one embodiment, the first notification information includes a part or all of the following content:

Content 1: Reason Information Based on which the Terminal Device Determines to Process the Uplink Traffic Flow or the Downlink Traffic Flow by Using a Second Processing Method The reason information indicates an internal state of the terminal device, indicate a reason why the terminal device enters the assistance steering mode, or indicate a link status, an access technology, a user preference, or the like.

For example, the reason information includes an indication of a low battery level, an indication of low power consumption, a resource optimization indication, a link congestion indication, an indication of a weak access signal, a user preference indication, or the like.

Content 2: First Duration Information in which the Terminal Device Uses the Second Processing Method The first duration information is specific valid duration, for example, indicates valid duration in which a current status lasts, valid duration in which the assistance steering mode lasts, or valid duration of the steering information sent by the terminal device.

In an optional implementation of at least one embodiment, the valid duration is monitored by setting a timer. For example, in response to the valid duration being 5 minutes, timing duration of the timer is set to 5 minutes. In response to the timer running normally, the current status lasts, or the assistance steering mode lasts. In response to the timer expiring, the current state is terminated, or the assistance steering mode is terminated.

Alternatively, the first duration information is a specific time point (for example, 3:00 PM) or a time period (for example, 2:00 PM to 3:00 PM).

Content 3: Information about the Second Processing Method

The information about the second processing method is traffic flow description information, steering information, or the like of the traffic flow.

In an optional implementation of at least one embodiment, the traffic flow description information is flow description information of the uplink traffic flow and/or the downlink traffic flow.

The steering information includes a steering solution that is for the downlink traffic flow and that is requested by the terminal device, or is a steering solution that is used by the terminal device for the uplink traffic flow, and includes an access technology indication, or an access technology indication and steering ratio information.

In response to the traffic flow description information being the description information of the downlink traffic flow, the user plane network element directly determines the downlink traffic flow based on the description information.

In response to the traffic flow description information being the description information of the uplink traffic flow corresponding to the downlink traffic flow, the user plane network element maps the description information of the uplink traffic flow into description information of the downlink traffic flow, and determines the downlink traffic flow based on the description information of the downlink traffic flow.

In response to the first notification information including the first duration information in which the terminal device uses the second processing method that is valid, in an optional implementation of at least one embodiment, after determining the third processing method, the user plane network element alternatively determines the second duration information in which the traffic flow is processed by using the third processing method.

The second duration information is determined by the user plane network element based on the first duration information, and the second duration information is less than or equal to the first duration information.

In an optional implementation of at least one embodiment, within valid time of the third processing method, a priority of the third processing method is higher than that of the fourth processing method. In at least one embodiment, in response to performing traffic flow processing, the user plane network element uses the fourth processing method, and preferentially uses the third processing method to process the traffic flow only within specified duration or specific time.

Further, in at least one embodiment, after receiving the first notification information, the user plane network element further sends second notification information to the terminal device. The second notification information includes second indication information, and the second indication information indicates whether the user plane network element changes the processing method for the downlink traffic flow.

The second notification information is understood as response information fed back by the user plane network element to the terminal device after receiving the first notification information. In this way, the terminal device is informed of whether the user plane network element uses a processing method consistent with that of the terminal device for the traffic flow, and the like.

in an optional implementation of at least one embodiment, the second notification information includes a part or all of the following content:

Content 1: Reason Information Based on which the User Plane Network Element Processes the Uplink Traffic Flow by Using the Third Processing Method The reason information indicates an internal status of the user plane network element, policy information of the user plane network element, or the like.

For example, the reason information includes that the user plane network element does not support the assistance steering mode of the terminal device.

Content 2: Second Duration Information in which the User Plane Network Element does not Change the Processing Method for the Downlink Traffic Flow In response to the second indication information indicating that the user plane network element does not change the processing method for the downlink traffic flow, the second notification message includes the second duration information in which the processing method for the downlink traffic flow remains unchanged.

The second duration information indicates the terminal device not to send the first notification information to the user plane network element within time specified by the second duration information.

Further, in an optional implementation of at least one embodiment, the terminal device further sends third notification information to the user plane network element device after the terminal device meets a second condition and resumes processing the uplink traffic flow by using the first processing method. The third notification information is for notifying the terminal device to process the traffic flow by using the first processing method.

Therefore, after receiving the third notification information, the user plane network element resumes processing the traffic flow by using the fourth processing method. To be specific, after the user plane network element receives that the terminal device exits the assistance steering mode, the user plane network element resumes the primary steering mode indicated by the session management network element.

In at least one embodiment, the first processing method for processing the traffic flow by the terminal device is the primary steering mode in which the terminal device performs traffic flow processing, or is another steering mode. For ease of description, the primary steering mode is for replacement in a subsequent example. In at least one embodiment, the second processing method for processing the traffic flow by the terminal device is the assistance steering mode in which the terminal device performs traffic flow processing, or is another steering mode. For ease of description, the assistance steering mode is for replacement subsequently. In at least one embodiment, the fourth processing method for processing the traffic flow by the user plane network element is the primary steering mode in which the user plane network element performs traffic flow processing, or is another steering mode. For ease of description, the primary steering mode is for replacement subsequently. In at least one embodiment, the third processing method for processing the traffic flow by the user plane network element is the assistance steering mode in which the user plane network element performs traffic flow processing, or is another steering mode. For ease of description, the assistance steering mode is for replacement subsequently.

Figure 5A:
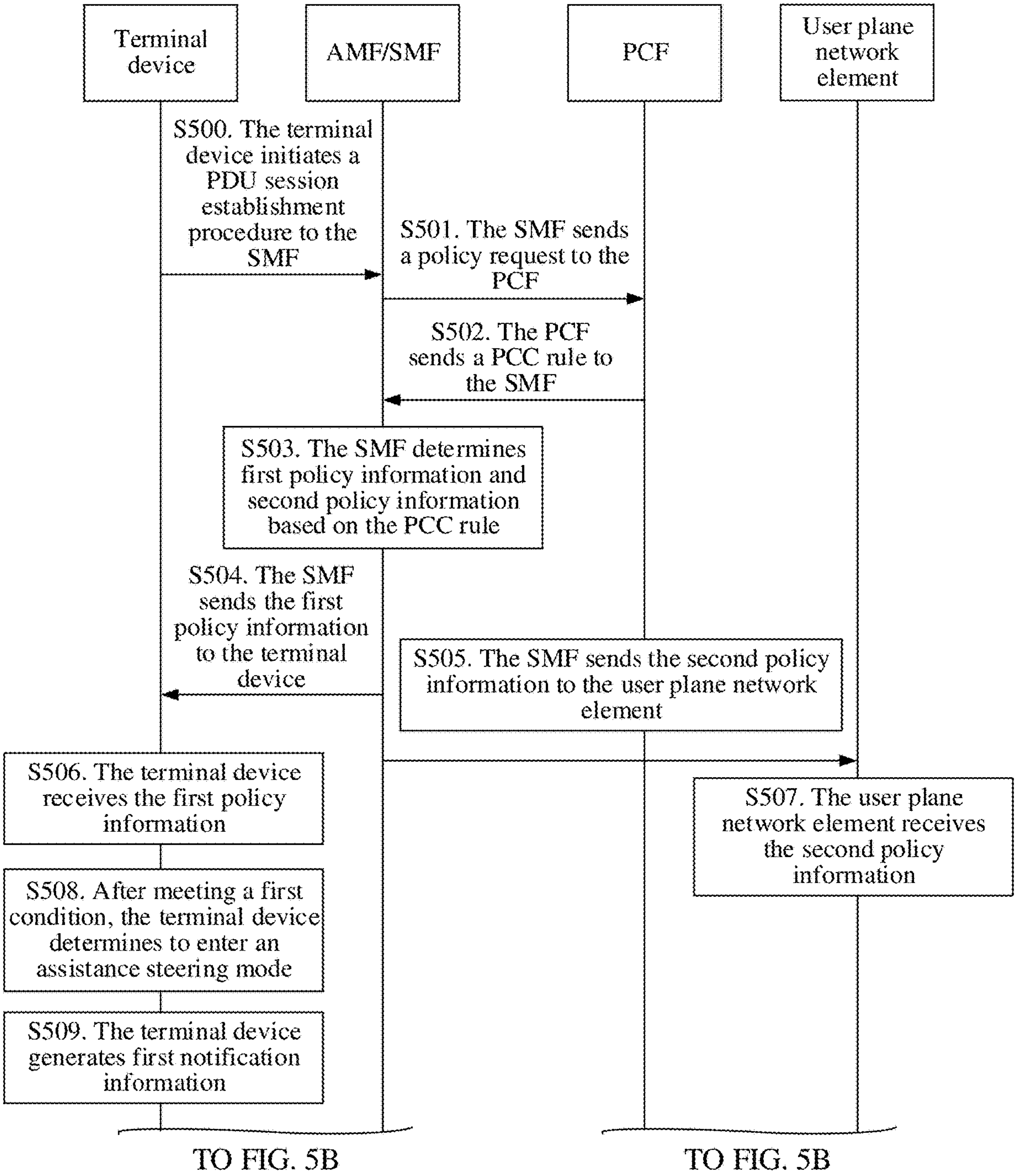
FIG. 5A and FIG. 5B are a schematic flowchart of a first traffic flow processing scenario according to at least one embodiment.
Figure 5B:
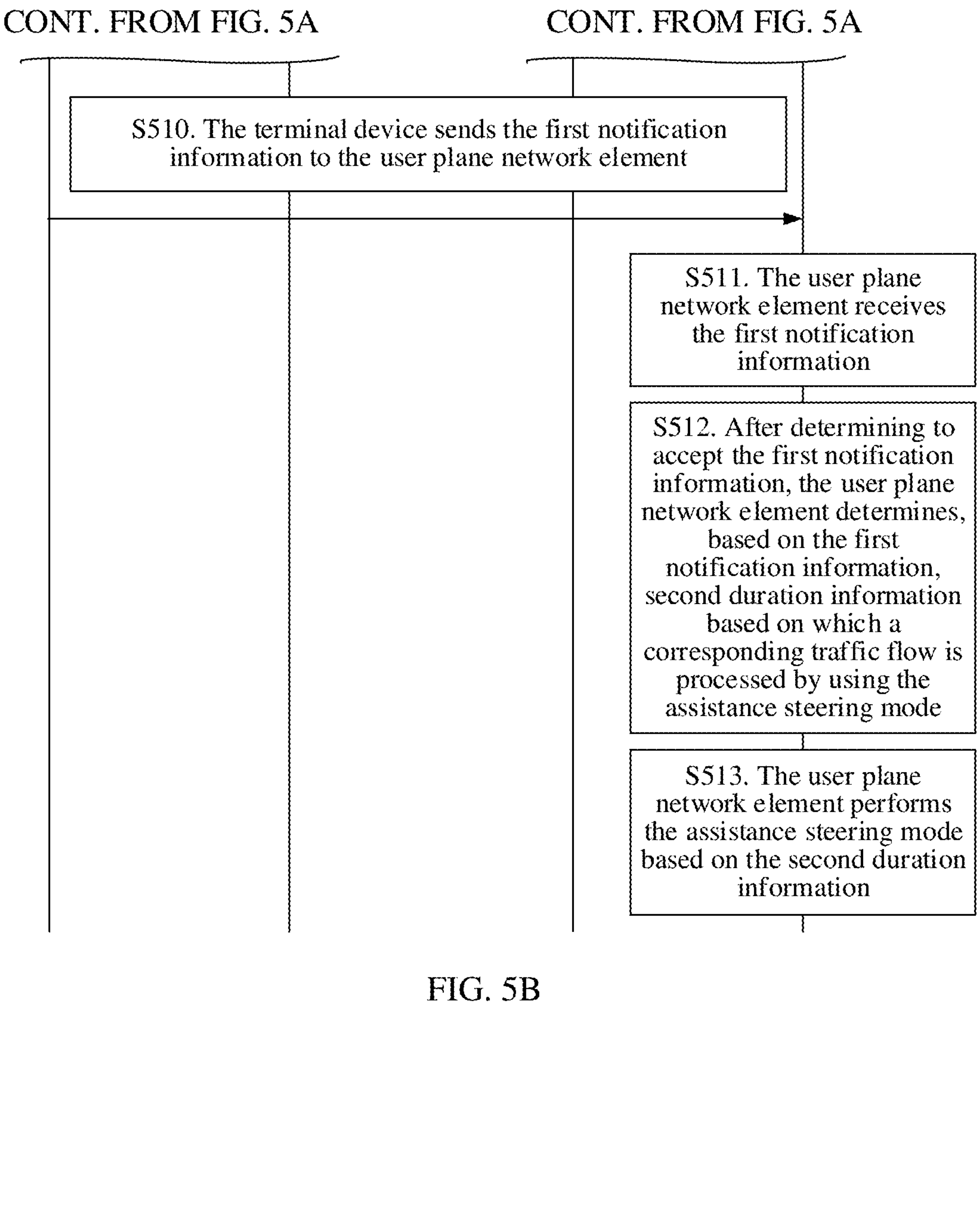

To better describe the content shown in FIG. 4, an example in FIG. 5A and FIG. 5B is used for description.

As shown in FIG. 5A and FIG. 5B, steps of a traffic flow steering method provided in at least one embodiment are as follows:

S500. A terminal device initiates a PDU session establishment procedure to an SMF.

In an optional implementation of at least one embodiment, the terminal device sends a PDU session establishment request message to the SMF, where the PDU session establishment request includes a PDU session identifier, and an MA PDU request indication that indicates to establish an MA PDU session.

S501. The SMF sends a policy request to a PCF.

In an optional implementation of at least one embodiment, the policy request includes the MA PDU session indication, to indicate that the PDU session is an MA PDU session.

S502. The PCF delivers a PCC rule to the SMF, where the PCC rule includes policy information. The PCC rule includes traffic flow description information, a steering mode, and a user equipment-assistance steering mode indication.

The traffic flow description information includes one or more pieces of IP 5-tuple information (where the IP 5-tuple information includes at least one of source and destination IP addresses, source and destination port numbers, and a protocol identifier), one or more pieces of MAC address information or VLAN identifier information, at least one application identifier, an SDF, at least one QFI, or the like.

The user equipment-assistance steering mode indication indicates a supported user equipment-assistance steering mode. The assistance steering mode includes but is not limited to an active-standby mode, a smallest delay mode, a load-balancing mode, and a priority-based mode.

A steering mode allocated by a network side to a traffic flow is referred to as an active mode.

S503. The SMF determines first policy information and second policy information based on the PCC rule.

The first policy information includes a primary steering mode in which the terminal device performs traffic flow processing. The second policy information includes a primary steering mode in which a user plane network element performs traffic flow processing.

In addition, in response to the first policy information allowing the terminal device to perform the assistance steering mode, the first policy information further includes first indication information. The first indication information indicates that the terminal device is capable of determining a processing method for the uplink traffic flow, that is, at least the terminal device performs the assistance steering mode.

In response to the second policy information allowing the user plane network element to cooperate with the terminal device in performing the assistance steering mode, the second policy information further includes second indication information. The second indication information indicates that the user plane network element is capable of determining a processing method for the downlink traffic flow. In an optional implementation of at least one embodiment, the first policy information and/or the second policy information is an ATSSS rule or a MAR (multi-access rule).

S504. The SMF sends the first policy information to the terminal device.

The first policy information further includes corresponding traffic flow description information and the like.

S505. The SMF sends the second policy information to the user plane network element.

The second policy information further includes corresponding traffic flow description information and the like.

S506. The terminal device receives the first policy information.

In an optional implementation of at least one embodiment, the terminal device further stores the first policy information.

Further, the terminal device processes a corresponding traffic flow in the primary steering mode based on the first policy information.

S507. The user plane network element receives the second policy information.

In an optional implementation of at least one embodiment, the user plane network element further stores the second policy information.

Further, the user plane network element processes a corresponding traffic flow in the primary steering mode based on the second policy information.

S508. After meeting a first condition, the terminal device determines to enter the assistance steering mode.

S509. The terminal device generates first notification information, where the first notification information indicates time at which the terminal device performs the assistance steering mode.

In an optional implementation of at least one embodiment, before generating the first notification information, the terminal device further first determines a steering solution in which the terminal device enters the assistance steering mode. Then, the terminal device generates the first notification information based on the steering solution in which the terminal device enters the assistance steering mode.

Assistance information in the first notification information indicates the time at which the terminal device performs the assistance steering mode.

The assistance information includes at least one of first duration information in which the terminal device uses the assistance steering mode and reason information based on which the terminal device uses the assistance steering mode.

The first duration information is specific valid duration, for example, indicates valid duration in which a current status lasts, valid duration in which the assistance steering mode lasts, or valid duration of the steering information sent by the terminal device. Alternatively, the first duration information is a specific time point (for example, 3:00 PM) or a time period (for example, 2:00 PM to 3:00 PM).

In an optional implementation of at least one embodiment, the valid duration is monitored by setting a timer. In response to the timer running normally, the current status lasts, or the assistance steering mode lasts. In response to the timer expiring, the current state is terminated, or the assistance steering mode is terminated.

Further, in at least one embodiment, the first notification information further includes other information, and is not specifically limited to traffic flow description information, steering information, and the like.

The traffic flow description information is flow description information of the uplink traffic flow and/or the downlink traffic flow. The steering information includes a steering solution that is for the downlink traffic flow and that is requested by the terminal device, or is a steering solution that is used by the terminal device for the uplink traffic flow, and includes an access technology indication, or an access technology indication and steering ratio information.

In an optional implementation of at least one embodiment, the first notification information is a PMF request.

S510. The terminal device sends the first notification information to the user plane network element.

S511. The user plane network element receives the first notification information.

S512. After determining to accept the first notification information, the user plane network element determines, based on the first notification information, second duration information based on which a corresponding traffic flow is processed by using the assistance steering mode.

In other words, the user plane network element determines, based on the first notification information, whether the assistance steering mode is performed, and determines, after determining that the assistance steering mode is performed, the second duration information in which the user plane network element processes the corresponding traffic flow by using the assistance steering mode.

The second duration information is less than or equal to execution time of the secondary steering mode indicated by the first notification information. In an optional implementation of at least one embodiment, the user plane network element receives the first notification information and a local status, and determines whether to accept the first notification information. Alternatively, the user plane network element receives the first notification information and the second policy information, and determines whether to accept the first notification information. Alternatively, the user plane network element receives the first notification information, a local status, and the second policy information, and determines whether to accept the first notification information.

For example, the user plane network element searches for the corresponding downlink traffic flow based on the traffic flow description information carried in the first notification information.

In response to the traffic flow description information indicating the downlink traffic flow, the user plane network element directly determines the downlink traffic flow based on the description information of the downlink traffic flow. In response to the traffic flow description information indicating the uplink traffic flow, the user plane network element maps the uplink traffic flow into description information of the downlink traffic flow (for example, at least one of source and destination IP addresses, source and destination port numbers, or a protocol identifier), and determines the downlink traffic flow based on the description information of the downlink traffic flow.

Then, the user plane network element determines the second policy information corresponding to the downlink traffic flow. In response to the second policy information not including an assistance steering mode indication, the user plane network element still uses the active mode to perform downlink traffic steering. Otherwise, in response to the second policy information including an assistance steering mode indication, the user plane network element processes the downlink traffic flow by using the assistance steering mode.

S513. The user plane network element performs the assistance steering mode based on the second duration information.

An optional implementation of at least one embodiment is as follows:

After the user plane network element determines to accept the first notification information, the user plane network element generates third policy information based on traffic flow information, steering information, and the like that are included in the first notification information, where the third policy information includes the assistance steering mode in which the user plane network element performs traffic flow processing.

The user plane network element stores the third policy information, and sets a priority of the third policy information to be higher than a priority of the second policy information. That is, a priority of the steering solution in the assistance steering mode is set to be higher than that of the steering solution in the primary steering mode.

Further, the user plane network element sets, based on the second duration information, a timer for the third policy information to take effect. In response to the timer not expiring, the third policy information takes effect. Because the priority of the third policy information is higher than that of the second policy information, the user plane network element processes the corresponding traffic flow by using the assistance steering mode. In response to the timer expiring, the third policy information becomes invalid, and the user plane network element processes the corresponding traffic flow by using the primary steering mode.

Further, after receiving the first notification information or after determining the second duration information, the user plane network element further feeds back a response message to the terminal device. The response message is for informing whether to accept the first notification information.

In an optional implementation of at least one embodiment, the response message includes a success or rejection indication, and indicates whether the user plane network element has modified a downlink traffic flow steering rule based on the first notification information sent by the terminal device.

In response to the response message including a success indication or an accept indication, the user plane network element has modified the downlink traffic flow steering rule based on the first notification information of the terminal device.

In response to the response message including a rejection or failure indication, the user plane network element refuses to modify the downlink traffic flow steering rule based on the first notification information of the terminal device, and continues to perform steering on the downlink traffic flow by using the primary steering mode.

In another optional implementation of at least one embodiment, a message name of the response message indicates a success or a failure.

After the user plane network element accepts the first notification information sent by the terminal device, the user plane network element feeds back a success message for the first notification information or a success message for the user equipment-assistance steering mode. After the user plane network element rejects the first notification information sent by the terminal device, the user plane network element feeds back a failure message for the first notification information or a failure message for the user equipment-assistance steering mode.

In addition, in at least one embodiment, the response message further includes other information, which is not specifically limited to the following content.

Information 1: After the response message indicates that the user plane network element accepts the first notification information of the terminal device, the response message includes time information that is set by the user plane network element and that is for performing the user equipment-assistance steering mode.

For example, the response message includes information about the timer set by the user plane network element.

The timer indicates that the terminal device does not initiate the first notification information for a same traffic flow before the timer expires. In addition, the timer indicates that the terminal device re-initiates the first notification information after the timer expires and in response to the traffic flow in the terminal device being still in the assistance steering mode. This is the same as step S510.

Information 2: After the response message indicates that the user plane network element rejects the first notification information of the terminal device, the response message includes the second duration information, to indicate to the terminal device that within time specified by the second duration information, the user plane network element does not receive the first notification information sent by the terminal device.

Information 3: The response message further includes traffic flow description information, steering information, or the like.

The traffic flow description information or the steering information is for identifying a specific traffic flow or specific steering information, to indicate an accepted or rejected traffic flow or accepted or rejected steering information.

Information 4: After the response message indicates that the user plane network element rejects the first notification information of the terminal device, the response message further includes a reason for rejection by the user plane network element.

The following is an example:

An ATSSS rule received by the terminal device includes flow description information of an uplink traffic flow 1, the load-balancing mode being the primary steering mode, and an assistance steering mode indication.

In response to a battery level of the terminal device being less than 5%, the terminal device enters the assistance steering mode. In this mode, the terminal device transmits all data packets of the uplink traffic flow 1 on a 3GPP side, instead of simultaneously transmitting data packets of a traffic flow 1 through 3GPP and non-3GPP by using the load-balancing mode of the primary steering mode.

Further, after determining to enter the assistance steering mode, the terminal device sends the first request to the user plane network element, where the first request carries the flow description information of the traffic flow 1, the steering information being a 3GPP access technology indication, a validity period being 5 minutes, and a cause value being "low battery".

The user plane network element receives the first request from the terminal device, where the first request includes the flow description information of the uplink traffic flow 1, the steering information being the 3GPP access technology indication, the validity period being 5 minutes, and the cause value being “low battery”.

The user plane network element searches for a downlink traffic flow corresponding to the traffic flow 1, to obtain a first steering rule of the downlink traffic flow.

Case 1: A primary steering mode included in the first steering rule is a smallest delay steering mode and an assistance steering mode indication.

In this case, the user plane network element determines, based on the assistance steering mode indication and the cause value “low battery”, to modify a downlink steering mode. In other words, the user plane network element no longer uses the smallest delay mode in the first steering rule as downlink steering, but generates a second steering rule based on the steering information sent by the terminal device. The second steering rule is a steering rule for steering the entire downlink traffic flow 1 to a 3GPP access side.

In addition, the user plane network element sets a validity period for the second steering rule to 5 minutes based on the validity period or the local policy sent by the terminal device. In response to the user plane network element receiving a downlink data packet of the traffic flow 1, the user plane network element finds, through searching, the first steering rule that includes the smallest delay steering mode and the second steering rule for steering all data packets to the 3GPP side. In response to the second steering rule being valid, a priority of the second steering rule is higher than that of the first steering rule. Therefore, the user plane network element performs steering on the downlink traffic flow 1 based on the second steering rule, that is, transmits all data packets of the downlink traffic flow of the traffic flow 1 by using a 3GPP access side tunnel.

Case 2: A primary steering mode included in the first steering rule is a smallest delay steering mode but does not include an assistance steering mode indication.

In this case, the user plane network element still performs steering on a downlink data packet of the traffic flow 1 by using the smallest delay mode.

Figure 6:
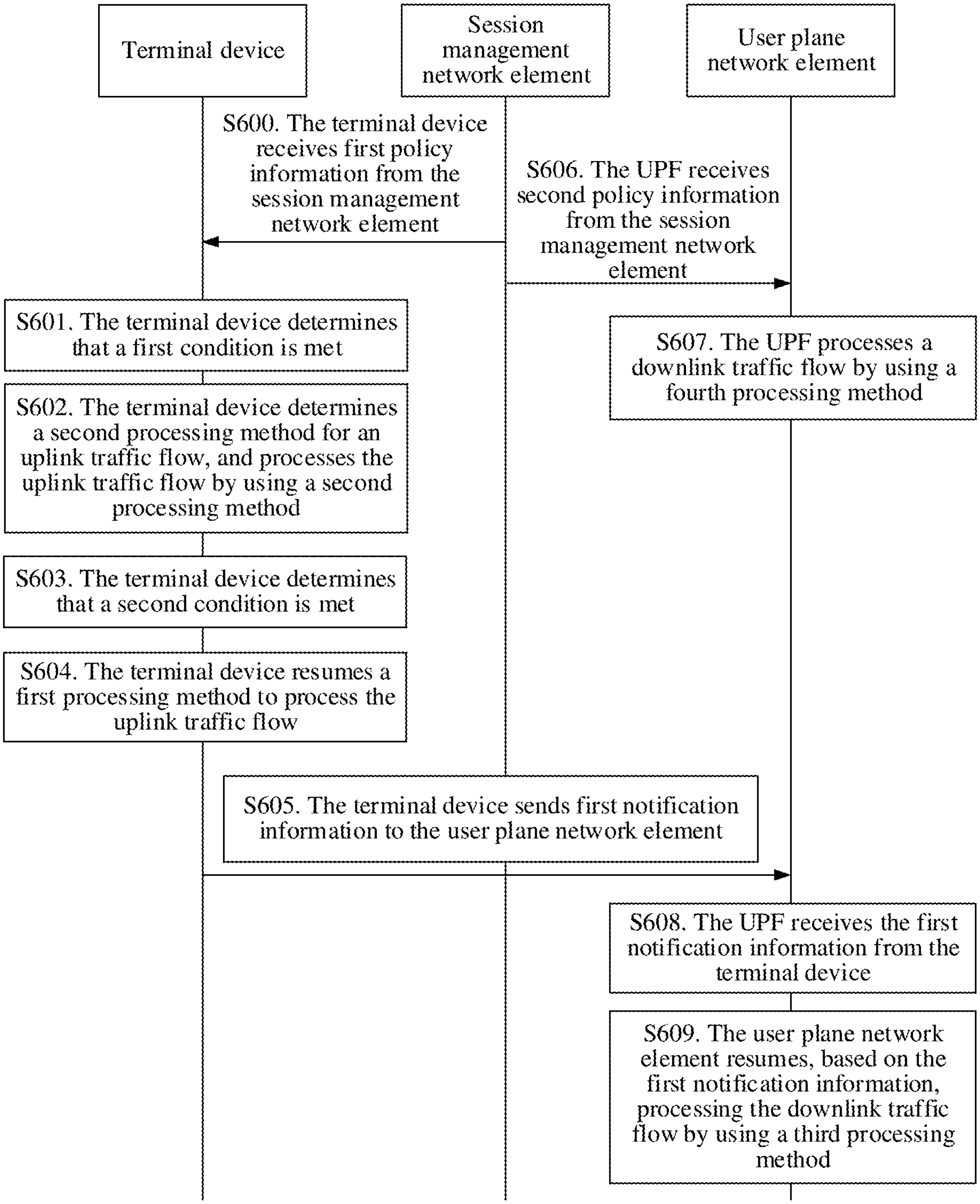
FIG. 6 is a schematic flowchart of a second traffic flow processing method according to at least one embodiment.

As shown in FIG. 6, steps of another traffic flow steering method provided in at least one embodiment are as follows:

S600. A terminal device receives first policy information from a session management network element, where the first policy information includes a first processing method for an uplink traffic flow.

In an optional implementation of at least one embodiment, the first processing method is understood as a primary steering mode in which the session management network element indicates the terminal device to perform traffic flow processing.

For example, a steering mode includes an active-standby mode, a smallest delay mode, a load-balancing mode, a priority-based mode, and the like.

In response to the first processing method being the active-standby mode, the session management network element indicates the terminal device to use the active-standby mode as the primary steering mode to perform traffic flow steering.

Further, the first policy information further includes first indication information, and the first indication information indicates that the terminal device is capable of determining a processing method for the uplink traffic flow.

S601. The terminal device determines that a first condition is met.

In an optional implementation of at least one embodiment, that the terminal device determines that the first condition is met is understood as: The terminal device determines that entering the assistance steering mode is met.

In at least one embodiment, the first condition is not limited to entering the assistance steering mode, meeting the assistance steering mode, or the like. Any steering mode applicable to at least one embodiment falls within the protection scope of at least one embodiment.

In an optional implementation of at least one embodiment, the terminal device determines, based on a current status of the terminal device, whether the first condition is met, that is, determine whether to trigger the terminal device to enter the assistance steering mode.

Further, the terminal device determines, based on the current status of the terminal device, which traffic flows of the terminal device enter the assistance steering mode, that is, determine a target traffic flow that enters the assistance steering mode.

For example, in response to a battery level of the terminal device being lower than a battery level threshold, traffic flows 1 to 3 are triggered to enter the assistance steering mode. The battery level threshold is assumed to be 10%, and a current battery level of the terminal device is assumed to be 9%. The terminal device determines that the battery level of the terminal device is lower than the battery level threshold. Therefore, the terminal device triggers the traffic flows 1 to 3 to enter the assistance steering mode.

S602. The terminal device determines a second processing method for the uplink traffic flow, and processes the uplink traffic flow by using the second processing method.

In an optional implementation of at least one embodiment, that the terminal device determines the second processing method for the uplink traffic flow is understood as: The terminal device determines a steering solution in which the terminal device determines that the uplink traffic enters the assistance steering mode.

After the uplink traffic flow of the terminal device enters the assistance steering mode, the terminal device does not perform steering on the uplink traffic flow in the primary steering mode, but the terminal device determines a steering mode.

For example, the terminal device selects one access technology to transmit the uplink traffic flow, or transmits, based on a steering ratio determined by the terminal device, the uplink traffic flow using two access technologies.

Further, in at least one embodiment, in response to determining the second processing method for the uplink traffic flow, the terminal device is to determine, based on the first indication information in the first policy information, that the terminal device determines the processing method for the uplink traffic flow.

S603. The terminal device determines that a second condition is met.

In an optional implementation of at least one embodiment, that the terminal device determines that the second condition is met is understood as: The terminal device determines that the primary steering mode is resumed.

In at least one embodiment, the second condition is not limited to entering the primary steering mode, meeting the primary steering mode, or the like. Any steering mode applicable to at least one embodiment falls within the protection scope of at least one embodiment.

In an optional implementation of at least one embodiment, the terminal device determines, based on the current status of the terminal device, whether the second condition is met, that is, determine whether to trigger the terminal device to resume the primary steering mode.

Further, the terminal device determines, based on the current status of the terminal device, which traffic flows of the terminal device for which the primary steering mode is resumed, that is, determine a target traffic flow for which the primary steering mode is resumed.

For example, in response to the battery level of the terminal device is higher than the battery level threshold, the primary steering mode is triggered to be resumed for the traffic flows 1 to 3. The battery level threshold is assumed to be 10%, and a current battery level of the terminal device is assumed to be 50%. The terminal device determines that the battery level of the terminal device is higher than the battery level threshold. Therefore, the terminal device triggers to resume the primary steering mode for the traffic flows 1 to 3.

S604. The terminal device resumes the first processing method to process the uplink traffic flow.

S605. The terminal device sends first notification information to a user plane network element, where the first notification information is for notifying that the terminal device processes the traffic flow by using the first processing method.

The terminal device sends the first notification information to the user plane network element, to notify the user plane network element that the terminal device has resumed the primary steering mode. The first notification information is a new message proposed in a process of a traffic flow steering method in at least one embodiment. Alternatively, the first notification information is an improvement on a request sent by the terminal device to the user plane network element. For example, the first notification information is a PMF request.

S606. The user plane network element receives second policy information from the session management network element, where the second policy information includes a fourth processing method for the downlink traffic flow of the terminal device.

In an optional implementation of at least one embodiment, the fourth processing method is understood as a primary steering mode in which the session management network element indicates the user plane network element to perform traffic flow processing.

S607. The user plane network element processes the downlink traffic flow by using the fourth processing method.

In an optional implementation of at least one embodiment, after the terminal device enters the assistance steering mode, the user plane network element itself also performs traffic flow processing by using the assistance steering mode. The fourth processing method in at least one embodiment is the assistance steering mode.

S608. The user plane network element receives the first notification information from the terminal device.

S609. The user plane network element resumes, based on the first notification information, processing the downlink traffic flow by using the third processing method.

According to the foregoing method, in at least one embodiment, after the terminal device meets the second condition and resumes the primary steering mode, the terminal device sends the third notification information to the user plane network element. In this way, after receiving the third notification information, the user plane network element resumes the first processing method to process the uplink traffic flow. This provides a solution to supporting the user plane network element in collaboration with the terminal device to resume the primary steering mode to perform downlink traffic flow steering, and has stronger adaptability.

The traffic flow steering steps in FIG. 6 constitute no limitation on at least one embodiment. For example, S606 and S600 are not performed in a particular sequence, and S606 is performed before S600. In addition, in a process of performing the traffic flow steering method in at least one embodiment, adaptive adjustment or deformation is performed on the foregoing steps based on an actual situation.

Further, in an optional implementation of at least one embodiment, in addition to indicating the terminal device to resume processing the traffic flow by using the first processing method, the first notification information further includes a part or all of the following content:

Content 1: Reason information based on which the terminal device resumes processing the uplink traffic flow by using the first processing method The reason information indicates an internal state of the terminal device, indicate a reason why the terminal device resumes the primary steering mode, or indicate a link status, an access technology, a user preference, or the like.

For example, the reason information includes an indication of a low battery level, an indication of low power consumption, a resource optimization indication, a link congestion indication, an indication of a weak access signal, a user preference indication, or the like.

Content 2: First Duration Information in which the Terminal Device Predicts to Resume the First Processing Method to Process the Uplink Traffic Flow The first duration information is specific valid duration, for example, indicates valid duration in which a current status lasts, or valid duration in which the assistance steering mode lasts.

Alternatively, the first duration information is a specific time point (for example, 3:00 PM) or a time period (for example, 2:00 PM to 3:00 PM).

For example, in response to the first duration information included in the first notification information being 3:00 PM, the terminal device resumes processing the traffic flow by using the first processing method at 3:00 PM. Therefore, the user plane network element also resumes processing the traffic flow by using the third processing method at 3:00 PM.

Content 3: Information about the First Processing Method

The information about the first processing method is traffic flow description information, steering information, or the like of the traffic flow.

In an optional implementation of at least one embodiment, the traffic flow description information is flow description information of the uplink traffic flow and/or the downlink traffic flow.

The steering information includes a steering solution that is for the downlink traffic flow and that is requested by the terminal device, or is a steering solution that is used by the terminal device for the uplink traffic flow, and includes an access technology indication, or an access technology indication and steering ratio information.

In response to the traffic flow description information being the description information of the downlink traffic flow, the user plane network element directly determines the downlink traffic flow based on the description information.

In response to the traffic flow description information being the description information of the uplink traffic flow corresponding to the downlink traffic flow, the user plane network element maps the description information of the uplink traffic flow into description information of the downlink traffic flow, and determines the downlink traffic flow based on the description information of the downlink traffic flow.

Further, in at least one embodiment, after receiving the first notification information, the user plane network element further sends second notification information to the terminal device. The second notification information includes second indication information, and the second indication information indicates whether the user plane network element changes the processing method for the downlink traffic flow.

The second notification information is understood as response information fed back by the user plane network element to the terminal device after receiving the first notification information. In this way, the terminal device is informed of whether the user plane network element uses a processing method consistent with that of the terminal device for the traffic flow, and the like.

in an optional implementation of at least one embodiment, the second notification information includes a part or all of the following content:

Content 1: Reason Information Based on which the User Plane Network Element Refuses to Resume Processing the Uplink Traffic Flow by Using the Third Processing Method The reason information indicates an internal status of the user plane network element, policy information of the user plane network element, or the like.

Content 2: Second Duration Information in which the User Plane Network Element does not Change the Processing Method for the Downlink Traffic Flow In response to the second indication information indicating that the user plane network element does not change the processing method for the downlink traffic flow, the second notification message includes the second duration information in which the processing method for the downlink traffic flow remains unchanged.

The second duration information indicates the terminal device not to send the first notification information to the user plane network element within time specified by the second duration information.

In at least one embodiment, the first processing method for processing the traffic flow by the terminal device is the primary steering mode in which the terminal device performs traffic flow processing, or is another steering mode. For ease of description, the primary steering mode is for replacement in a subsequent example. In at least one embodiment, the second processing method for processing the traffic flow by the terminal device is the assistance steering mode in which the terminal device performs traffic flow processing, or is another steering mode. For ease of description, the assistance steering mode is for replacement subsequently. In at least one embodiment, the fourth processing method for processing the traffic flow by the user plane network element is the primary steering mode in which the user plane network element performs traffic flow processing, or is another steering mode. For ease of description, the primary steering mode is for replacement subsequently. In at least one embodiment, the third processing method for processing the traffic flow by the user plane network element is the assistance steering mode in which the user plane network element performs traffic flow processing, or is another steering mode. For ease of description, the assistance steering mode is for replacement subsequently.

To better describe the content shown in FIG. 6, the following Embodiment is provided for detailed description. The following embodiment is merely used as an example for description, and constitutes no limitation on at least one embodiment.

Embodiment: The first notification information is a request for terminating the assistance steering mode.

Figure 7:
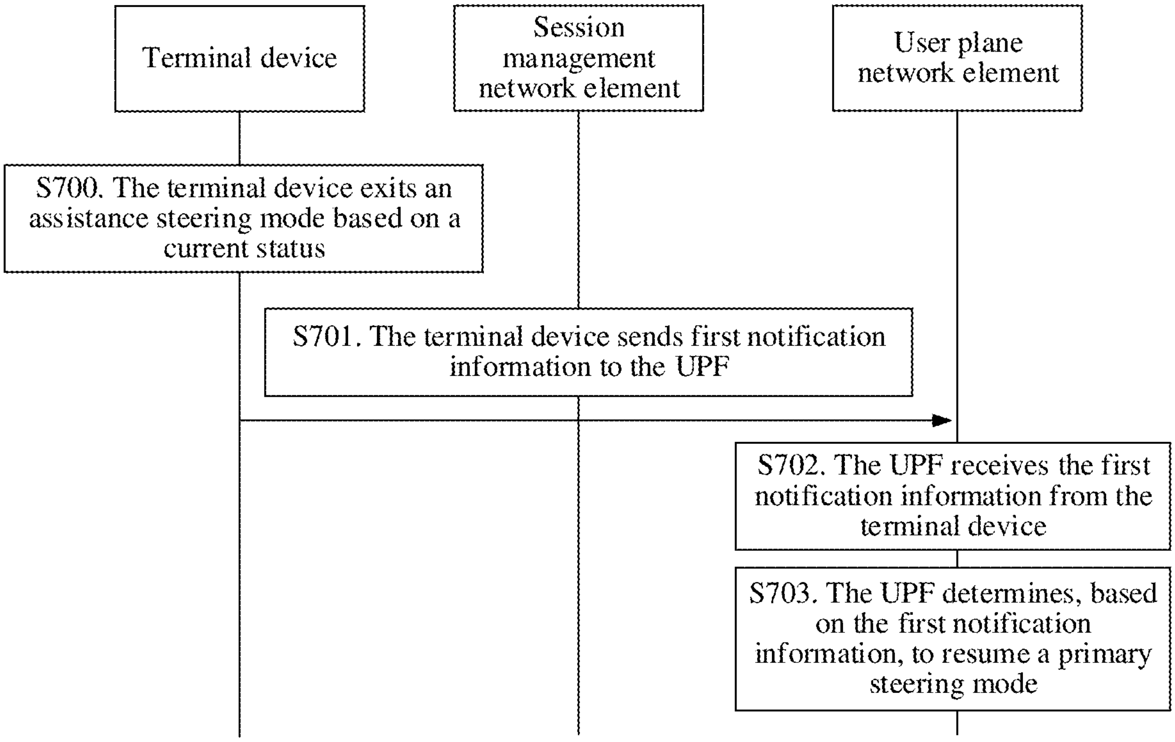
FIG. 7 is a schematic flowchart of a second traffic flow processing scenario according to at least one embodiment.

As shown in FIG. 7, steps of a traffic flow steering method provided in at least one embodiment are as follows:

S700. A terminal device exits an assistance steering mode based on a current status.

In an optional implementation of at least one embodiment, in response to the terminal device having sufficient power (for example, a battery level exceeds 20%) and/or in response to a link not being congested, the terminal device exits the assistance steering mode, that is, the terminal device resumes performing steering on an uplink traffic flow by using a primary steering mode.

S701. The terminal device sends first notification information to a user plane network element, where the first notification information is a request for terminating the assistance steering mode.

The first notification information includes an assistance steering mode termination indication or a primary steering mode resume indication, to indicate that the assistance steering mode is terminated, or indicate that the terminal device performs steering on the uplink traffic flow by using the primary steering mode, or indicates that the terminal device requests to perform steering on a downlink traffic flow based on the primary steering mode.

In an optional implementation of at least one embodiment, the first notification information is a PMF request.

In an optional implementation of at least one embodiment, the first notification information further includes traffic flow description information, to indicate that the assistance steering mode is terminated for the traffic flow, or that the primary steering mode is resumed for the traffic flow.

S702. The user plane network element receives the first notification information.

S703. The user plane network element determines, based on the first notification information, to resume the primary steering mode.

In an optional implementation of at least one embodiment, after receiving the first notification information, the user plane network element updates a steering mode for the downlink traffic flow based on the foregoing information, that is, resumes the primary steering mode.

The steering method shown in FIG. 7 is combined with the steering method shown in FIG. 5A and FIG. 5B. For example, after receiving an indication for terminating the assistance steering mode, the user plane network element sets third policy information to invalid. In this way, downlink traffic steering based on the primary steering mode included in the second policy information is resumed. To be specific, in response to the user plane network element being in the assistance steering mode, and execution duration of the assistance steering mode is still within valid duration, but the user plane network element receives the indication for terminating the assistance steering mode, the user plane network element directly resumes the primary steering mode.

In at least one embodiment, before S700, steps S500 to S507 is further performed. For brief description, refer to content in the foregoing case 1. Details are not described herein again.

Further, after receiving the first notification information, the user plane network element further feeds back a response message to the terminal device. The response message is for informing whether to receive the first notification information.

In an optional implementation of at least one embodiment, the response message includes a success or rejection indication, and indicates whether the user plane network element has modified a downlink traffic flow steering rule based on the first notification information sent by the terminal device.

In response to the response message including a success indication or an accept indication, the user plane network element has modified the downlink traffic flow steering rule based on the first notification information of the terminal device.

In response to the response message including a rejection or failure indication, the user plane network element refuses to modify the downlink traffic flow steering rule based on the first notification information of the terminal device, and continues to perform steering on the downlink traffic flow by using the assistance steering mode.

In another optional implementation of at least one embodiment, a message name of the response message indicates a success or a failure.

After the user plane network element accepts the first notification information sent by the terminal device, the user plane network element feeds back a success message for the first notification information or a success message for resuming the primary steering mode by the terminal device. After the user plane network element rejects the first notification information sent by the terminal device, the user plane network element feeds back a failure message for the first notification information or a failure message for resuming the primary steering mode.

In addition, in at least one embodiment, the response message further includes a reason for rejection by the user plane network element.

According to the foregoing descriptions of the solutions in at least one embodiment, to implement the foregoing functions, devices in the foregoing implementations include corresponding hardware structures and/or software modules for performing the functions. A person of ordinary skill in the art should easily be aware that, in combination with units and algorithm steps of the examples described in the embodiments disclosed herein, at least one embodiment is implemented by hardware or a combination of hardware and computer software. Whether a function is performed by hardware or hardware driven by computer software depends on particular applications and design constraints of the technical solutions. A person skilled in the art uses different methods to implement the described functions for each particular application, but the implementation does not go beyond the scope of embodiments described herein.

Figure 8:
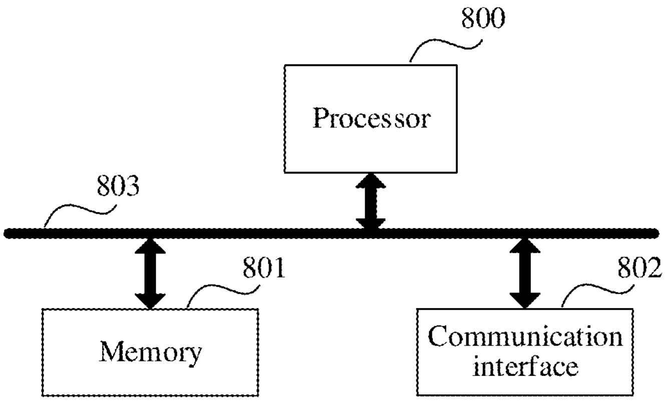
FIG. 8 is a schematic diagram of a traffic flow processing apparatus according to at least one embodiment.

Based on the foregoing embodiments, as shown in FIG. 8, at least one embodiment further provides a traffic flow processing apparatus. The apparatus includes a processor 800, a memory 801, and a communication interface 802.

The processor 800 is responsible for managing a bus architecture and common processing, and the memory 801 stores data used in response to the processor 800 performs an operation. The communication interface 802 is configured to receive and send data under control of the processor 800 to perform data communication with the memory 801.

The processor 800 is a central processing unit (CPU), a network processor (NP), or a combination of the CPU and the NP. The processor 800 further includes a hardware chip. The foregoing hardware chip is an application-specific integrated circuit (ASIC), a programmable logic device (PLD), or a combination thereof. The PLD is a complex programmable logic device (CPLD), a field-programmable gate array (FPGA), generic array logic (GAL), or any combination thereof. The memory 801 includes: various media that stores program code, such as a USB flash drive, a removable hard disk, a read-only memory (ROM), a random access memory (RAM), a magnetic disk, or an optical disc.

The processor 800, the memory 801, and the communication interface 802 are connected to each other. In an optional implementation of at least one embodiment, the processor 800, the memory 801, and the communication interface 802 is connected to each other by using a bus 803. The bus 803 is a peripheral component interconnect (PCI) bus, an extended industry standard architecture (EISA) bus, or the like. The bus is classified into an address bus, a data bus, a control bus, and the like. For ease of representation, only one thick line is used to represent the bus in FIG. 8, but this does not mean that there is only one bus or only one type of bus.

In response to the traffic flow processing apparatus being a terminal device, the processor 800 is configured to: read a program in the memory 801, and perform the method procedure performed by the terminal device in S400 to S404 shown in FIG. 4, perform the method procedure performed by the terminal device in S500 to S511 shown in FIG. 5A and FIG. 5B, perform the method procedure performed by the terminal device in S600 to S603 shown in FIG. 6, or perform the method procedure performed by the terminal device in S700 to S706 shown in FIG. 7.

In response to the traffic flow processing apparatus being a user plane network element, the processor 800 is configured to: read a program in the memory 801, and perform the method procedure performed by the user plane network element in S400 to S404 shown in FIG. 4, perform the method procedure performed by the user plane network element in S500 to S511 shown in FIG. and FIG. 5B, perform the method procedure performed by the user plane network element in S600 to S603 shown in FIG. 6, or perform the method procedure performed by the user plane network element in S700 to S706 shown in FIG. 7.

Figure 9:
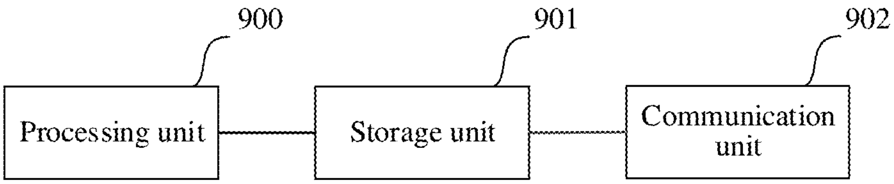
FIG. 9 is a schematic diagram of another traffic flow processing apparatus according to at least one embodiment.

As shown in FIG. 9, at least one embodiment provides a traffic flow processing apparatus. The traffic flow processing apparatus includes: at least one processing unit 900, at least one storage unit 901, and at least one communication unit 902. The communication unit 902 is configured to receive and send data under control of the processing unit 900, and the storage unit 901 stores program code.

In an optional implementation of at least one embodiment, the traffic flow processing apparatus is a terminal device. In response to the program code being executed by the processing unit 900, the processing unit 900 performs the following processes:

receiving, via the communication unit 902, first policy information from a session management network element, where the first policy information includes a first processing method for an uplink traffic flow; in response to the terminal device meeting a first condition, determining a second processing method for the uplink traffic flow or a downlink traffic flow; and sending first notification information to a user plane network element via the communication unit 902, where the first notification information is for notifying the user plane network element to determine a third processing method for a downlink traffic flow corresponding to the uplink traffic flow.

In at least one embodiment, the first policy information further includes first indication information, and the first indication information indicates that the terminal device is capable of determining a processing method for the uplink traffic flow.

In at least one embodiment, the first notification information includes: reason information based on which the terminal device determines to process the uplink traffic flow by using the second processing method; and/or first duration information in which the terminal device determines that the second processing method is valid.

In at least one embodiment, the first notification information further includes: information about the second processing method.

In at least one embodiment, the information about the second processing method includes: description information and steering information of the uplink traffic flow corresponding to the downlink traffic flow; or flow description information and steering information of the downlink traffic flow.

In at least one embodiment, the processing unit 900 is further configured to:

receive second notification information from the user plane network element, where the second notification information includes second indication information, and the second indication information indicates whether the user plane network element changes the processing method for the downlink traffic flow.

In at least one embodiment, in response to the second indication information indicating that the user plane network element does not change the processing method for the downlink traffic flow, the second notification message further includes: second duration information in which the processing method for the downlink traffic flow remains unchanged.

In at least one embodiment, the terminal device does not send the first notification information to the user plane network element within time specified by the second duration information.

In at least one embodiment, the processing unit 900 is further configured to:

if the terminal device meets a second condition, determine to process the uplink traffic flow by using the first processing method.

In at least one embodiment, the processing unit 900 is further configured to:

send third notification information to the user plane network element, to notify that the terminal device processes the uplink traffic flow by using the first processing method.

In an optional implementation of at least one embodiment, the traffic flow processing apparatus is a user plane network element. In response to the program code being executed by the processing unit 900, the processing unit 900 performs the following processes:

receiving second policy information from a session management network element via the communication unit 902, where the second policy information includes a fourth processing method for a downlink traffic flow of a terminal device; processing the downlink traffic flow by using a fourth processing method; receiving first notification information from the terminal device via the communication unit 902, where the first notification information is for notifying the user plane network element to determine a third processing method for the downlink traffic flow; and determining the third processing method based on the first notification information.

In at least one embodiment, the second policy information further includes second indication information, and the second indication information indicates that the user plane network element is capable of determining a processing method for the downlink traffic flow.

In at least one embodiment, the first notification information includes: reason information based on which the terminal device determines to process an uplink traffic flow by using a second processing method.

In at least one embodiment, the processing unit 900 is configured to:

determining the third processing method according to the reason information and the second indication information. In at least one embodiment, the first notification information further includes:

description information and steering information of the uplink traffic flow corresponding to the downlink traffic flow; or flow description information and steering information of the downlink traffic flow.

In at least one embodiment, the processing unit 900 is configured to:

determine the third processing method based on the description information and the steering information of the uplink or downlink traffic flow.

In at least one embodiment, a priority of the third processing method is higher than that of the fourth processing method.

In at least one embodiment, the processing unit 900 is further configured to:

determine second duration information for using the third processing method.

In at least one embodiment, the first notification information further includes: first duration information in which the terminal device determines that the second processing method is valid.

In at least one embodiment, the processing unit 900 is configured to:

determine the second duration information based on the first duration information.

In at least one embodiment, the processing unit 900 is further configured to:

send second notification information to the terminal device, where the second notification information includes second indication information, and the second indication information indicates whether the user plane network element changes the processing method for the downlink traffic flow.

In at least one embodiment, in response to the second indication information indicates that the user plane network element does not change the processing method for the downlink traffic flow, the second notification message further includes: second duration information in which the processing method for the downlink traffic flow remains unchanged.

In at least one embodiment, the processing unit 900 is further configured to:

skip receiving, within time specified by the second duration information, the first notification information sent by the terminal device.

In at least one embodiment, the processing unit 900 is further configured to:

receive third notification information from the terminal device, where the third notification information is for notifying that the terminal device processes the traffic flow by using a first processing method.

In at least one embodiment, the processing unit 900 is further configured to:

resume processing the traffic flow by using the fourth processing method.

As shown in FIG. 9, at least one embodiment provides a traffic flow processing apparatus. The traffic flow processing apparatus includes: at least one processing unit 900, at least one storage unit 901, and at least one communication unit 902. The communication unit 902 is configured to receive and send data under control of the processing unit 900, and the storage unit 901 stores program code.

In an optional implementation of at least one embodiment, the traffic flow processing apparatus is a terminal device. In response to the program code being executed by the processing unit 900, the processing unit 900 performs the following processes:

receiving, via the communication unit 902, first policy information from a session management network element, where the first policy information includes a first processing method for an uplink traffic flow; after a first condition is met, determining a second processing method for the uplink traffic flow or a downlink traffic flow, and processing the uplink traffic flow by using the second processing method; determining that a second condition is met, and resuming processing the uplink traffic flow by using the first processing method; and sending first notification information to a user plane network element via the communication unit 902, where the first notification information is for notifying that the terminal device processes the traffic flow by using the first processing method.

In at least one embodiment, the first policy information further includes first indication information, and the first indication information indicates that the terminal device is capable of determining a processing method for the uplink traffic flow.

In at least one embodiment, the first notification information includes: reason information based on which the terminal device resumes processing the uplink traffic flow by using the first processing method.

In at least one embodiment, the first notification information further includes: information about the first processing method.

In at least one embodiment, the processing unit 900 is further configured to:

receive second notification information from the user plane network element, where the second notification information includes third indication information, and the third indication information indicates whether the user plane network element changes a processing method for the downlink traffic flow.

As shown in FIG. 9, at least one embodiment provides a traffic flow processing apparatus. The traffic flow processing apparatus includes: at least one processing unit 900, at least one storage unit 901, and at least one communication unit 902. The communication unit 902 is configured to receive and send data under control of the processing unit 900, and the storage unit 901 stores program code.

In an optional implementation of at least one embodiment, the traffic flow processing apparatus is a user plane network element. In response to the program code being executed by the processing unit 900, the processing unit 900 performs the following processes:

receiving second policy information from a session management network element via the communication unit 902, where the second policy information includes a third processing method for a downlink traffic flow of a terminal device; processing the downlink traffic flow by using a fourth processing method; receiving first notification information from the terminal device via the communication unit 902, where the first notification information is for notifying that the terminal device resumes processing the traffic flow by using a first processing method; and resuming, based on the first notification information, processing the downlink traffic flow by using the third processing method.

In at least one embodiment, the second policy information further includes second indication information, and the second indication information indicates that the user plane network element is capable of determining a processing method for the downlink traffic flow.

In at least one embodiment, the first notification information includes: reason information based on which the terminal device resumes processing the uplink traffic flow by using the first processing method.

In at least one embodiment, before the user plane network element processes the downlink traffic flow by using the fourth processing method, the communication unit 902 is further configured to:

receive third notification information from the terminal device, where the third notification information is for notifying the user plane network element to determine the fourth processing method for the downlink traffic flow.

The processing unit 900 is further configured to:

determine the fourth processing method based on the third notification information.

In at least one embodiment, the third notification information includes: reason information based on which the terminal device determines to process an uplink traffic flow by using a second processing method.

In at least one embodiment, the processing unit 900 is configured to:

determine the fourth processing method based on the second indication information and the reason information based on which the terminal device determines to process the uplink traffic flow or the downlink traffic flow by using the second processing method.

In at least one embodiment, the processing unit 900 is configured to:

determine the fourth processing method based on a local policy of the user plane network element and the reason information based on which the terminal device determines to process the uplink traffic flow or the downlink traffic flow by using the second processing method.

In at least one embodiment, the processing unit 900 is configured to:

determine the fourth processing method based on the second indication information, a local policy of the user plane network element, and the reason information based on which the terminal device determines to process the uplink traffic flow or the downlink traffic flow by using the second processing method.

In at least one embodiment, the first notification information and/or the third notification information further includes: description information and steering information of the uplink traffic flow corresponding to the downlink traffic flow.

In at least one embodiment, the first notification information and/or the third notification information further includes: description information and steering information of the downlink traffic flow.

In at least one embodiment, a priority of the fourth processing method is higher than that of the third processing method.

In at least one embodiment, the third notification information further includes: first duration information in which the terminal device determines that the second processing method is valid.

In at least one embodiment, the processing unit 900 is further configured to:

determining second duration information for using the fourth processing method.

In at least one embodiment, the processing unit 900 is configured to:

determine the second duration information based on the first duration information.

In at least one embodiment, the communication unit 902 is further configured to:

send second notification information to the terminal device, where the second notification information includes third indication information, and the third indication information indicates whether the user plane network element changes the processing method for the downlink traffic flow.

In at least one embodiment, in response to the third indication information indicating that the user plane network element does not change the processing method for the downlink traffic flow, the second notification message further includes: second duration information in which the processing method for the downlink traffic flow remains unchanged.

In at least one embodiment, the processing unit 900 is further configured to:

skip receiving, within time specified by the second duration information, the third notification information sent by the terminal device.

Functions of the communication unit 902 and the processing unit 900 shown in FIG. 9 is performed by the processor 800 by running the program in the memory 801, or separately performed by the processor 800.

The traffic flow processing apparatus shown in FIG. 9 is the terminal device in the foregoing embodiments or a chip in the terminal device, or is the user plane network element in the foregoing embodiments or a chip in the user plane network element.

As shown in FIG. 2, at least one embodiment provides a traffic flow processing system. The traffic flow processing system includes: a terminal device 200, a session management network element 210, and a user plane network element 220.

In an optional implementation of at least one embodiment:

The session management network element 210 is configured to: send first policy information to the terminal device, where the first policy information includes a first processing method for an uplink traffic flow; and send second policy information to the user plane network element, where the second policy information includes a fourth processing method for a downlink traffic flow of the terminal device.

The terminal device 200 is configured to: receive the first policy information from the session management network element; in response to the terminal device meeting a first condition, determine a second processing method for the uplink traffic flow or a downlink traffic flow; and send first notification information to the user plane network element, where the first notification information is for notifying the user plane network element to determine a third processing method for the downlink traffic flow corresponding to the uplink traffic flow.

The user plane network element 220 is configured to: receive the second policy information from the session management network element; process the downlink traffic flow by using the fourth processing method; receive first notification information from the terminal device, where the first notification information is for notifying the user plane network element to determine the third processing method for the downlink traffic flow; and determine the third processing method based on the first notification information.

In another optional implementation of at least one embodiment:

The session management network element 210 is configured to: send first policy information to the terminal device, where the first policy information includes a first processing method for an uplink traffic flow; and send second policy information to the user plane network element, where the second policy information includes a third processing method for a downlink traffic flow of the terminal device.

The terminal device 200 is configured to: receive the first policy information from the session management network element; after a first condition is met, determine a second processing method for the uplink traffic flow or the downlink traffic flow, and process the uplink traffic flow by using the second processing method; determine that a second condition is met, and resume processing the uplink traffic flow by using the first processing method; and send first notification information to the user plane network element, where the first notification information is for notifying that the terminal device processes the traffic flow by using the first processing method.

The user plane network element 220 is configured to: receive the second policy information from the session management network element; process the downlink traffic flow by using a fourth processing method; receive first notification information from the terminal device, where the first notification information is for notifying that the terminal device resumes processing the traffic flow by using a first processing method; and resume, based on the first notification information, processing the downlink traffic flow by using the third processing method.

In at least one embodiment, aspects of the traffic flow steering method provided in embodiments of at least one embodiment is alternatively implemented in a form of a program product, including program code. In response to the program code being run on a computer device, the program code is for enabling the computer device to perform steps in the traffic flow steering methods according to various example implementations of at least one embodiment described in at least one embodiment.

The program product uses any combination of one or more readable media. The readable medium is a readable signal medium or a readable storage medium. The readable storage medium is, for example, but is not limited to, an electrical, a magnetic, an optical, an electromagnetic, an infrared, or a semiconductor system, apparatus, or device, or any combination thereof. More specific examples (non-exhaustive) of the readable storage medium include: an electrical connection having one or more conductors, a portable disk, a hard disk drive, random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

A program product for performing traffic flow steering according to implementations of at least one embodiment uses a portable compact disk read-only memory (CD-ROM), include program code, and runs on a server device. However, the program product in at least one embodiment is not limited thereto. In at least one embodiment, the readable storage medium is any tangible medium that includes or stores a program, and the program is transmitted in information and used by an apparatus or a component or used in combination with an apparatus or a component.

The readable signal medium includes a data signal that is propagated in a baseband or as part of a cell, and carries readable program code. The propagated data signal is in various forms, including, but not limited to, an electromagnetic signal, an optical signal, or any suitable combination thereof. The readable signal medium is alternatively any readable medium other than the readable storage medium. The readable medium sends, propagates, or transmits a program for use by or for use in combination with a recurrent network action system, apparatus, or device.

The program code included on the readable medium is transmitted using any suitable medium, including, but not limited to, wireless, wired, optical cable, RF, or any suitable combination thereof.

Program code for performing the operations of at least one embodiment is written in any combination of one or more programming languages, including object-oriented programming languages such as Java and C++, as well as conventional procedural programming languages such as "C" or similar programming languages. The program code is executed entirely on a user computing device, partially on user equipment, as a separate software package, partially on a user computing device, partially on a remote computing device, or entirely on a remote computing device or server. In situations involving a remote computing device, the remote computing device is connected to a user computing device through any kind of network, including a local area network (LAN) or a wide area network (WAN), or is connected to an external computing device.

At least one embodiment further provides a computing device-readable storage medium for a traffic flow steering method performed by a terminal device, to be specific, content is not lost after a power failure. The storage medium stores a software program, including program code. In response to the program code being run on a computing device, the software program implements any one of the foregoing traffic flow steering solutions in at least one embodiment in response to being read and executed by one or more processors.

At least one embodiment further provides a computing device-readable storage medium for a traffic flow steering method performed by a network device, to be specific, content is not lost after a power failure. The storage medium stores a software program, including program code. In response to the program code being run on a computing device, the software program implements any one of the foregoing traffic flow steering solutions in at least one embodiment in response to being read and executed by one or more processors.

The foregoing describes at least one embodiment with reference to block diagrams and/or flowcharts that show the method, the apparatus (system), and/or the computer program product according to at least one embodiment. A block in the block diagrams and/or the flowcharts and a combination of blocks in the block diagrams and/or the flowcharts is implemented by using computer program instructions. These computer program instructions is provided to a processor of a general-purpose computer or a dedicated computer, and/or other programmable data processing apparatuses to generate a machine such that the instructions executed by the computer processor and/or other programmable data processing apparatuses create a method for implementing a function/action specified in the block diagrams and/or flowcharts.

Correspondingly, at least one embodiment is also implemented by using hardware and/or software (including firmware, resident software, microcode, and the like). Further, in at least one embodiment, a form of a computer program product on a computer-usable or computer-readable storage medium is used, and the computer program product has computer-usable or computer-readable program code implemented in the medium for use by or uses in combination with an instruction execution system. In the context of at least one embodiment, the computer-usable or the computer-readable medium is any medium that includes, stores, communicates, transmits, or transfers a program, for use by or use in combination with an instruction execution system, apparatus, or device.

Although at least one embodiment has been described with reference to specific features and embodiments thereof, various modifications and combinations are made to at least one embodiment without departing from the spirit and scope of embodiments described herein. Correspondingly, embodiments described herein and the accompanying drawings are merely example descriptions of at least one embodiment defined by the appended claims, and are considered to have covered any and all modifications, variations, combinations, or equivalents that fall within the scope of embodiments described herein. A person skilled in the art is able to make various modifications and variations to embodiments described herein without departing from the scope of embodiments described herein. At least one embodiment is intended to cover these modifications and variations of embodiments described herein provided that they fall within the scope defined by the following claims and their equivalent technologies.

What is claimed is:

1. A method, comprising:

receiving, by a terminal device, first policy information from a session management network element, wherein the first policy information comprises a first processing method for an uplink traffic flow;

in response to the terminal device meeting a first condition, determining, by the terminal device, a second processing method for the uplink traffic flow; and sending, by the terminal device, first notification information to a user plane network element, wherein the first notification information is for notifying the user plane network element to determine a processing method for a downlink traffic flow corresponding to the uplink traffic flow;

in response to the terminal device meeting a second condition, determining, by the terminal device, to process the uplink traffic flow by using the first processing method; and sending, by the terminal device, third notification information to the user plane network element, to notify that the terminal device processes the uplink traffic flow by using the first processing method.

2. The method according to claim 1, wherein the receiving the first policy information further includes receiving the first policy information including first indication information, wherein the first indication information indicates that the terminal device is capable of determining a processing method for the uplink traffic flow.

3. The method according to claim 1, wherein the sending the first notification information includes sending:

reason information based on which the terminal device determines to process the uplink traffic flow by using the second processing method; and/or first duration information in which the terminal device determines that the second processing method is valid.

4. The method according to claim 3, wherein the sending the first notification information further includes sending information about the second processing method.

5. The method according to claim 4, wherein the sending the information about the second processing method includes sending:

description information and steering information of the uplink traffic flow.

6. A traffic flow processing method, comprising:

receiving, by a user plane network element, second policy information from a session management network element, wherein the second policy information comprises a fourth processing method for a downlink traffic flow of a terminal device;

processing, by the user plane network element, the downlink traffic flow by using the fourth processing method;

receiving, by the user plane network element, first notification information from the terminal device, wherein the first notification information is for notifying the user plane network element to determine a processing method for the downlink traffic flow; and determining, by the user plane network element based on the first notification information, to process the downlink traffic flow by using a third processing method;

receiving, by the user plane network element, third notification information from the terminal device, wherein the third notification information is for notifying that the terminal device processes the traffic flow by using a first processing method;

processing, by the user plane network element, the traffic flow by using the fourth processing method.

7. The method according to claim 6, wherein the receiving the second policy information further includes receiving second indication information, wherein the second indication information indicates that the user plane network element is capable of modifying the processing method for the downlink traffic flow.

8. The method according to claim 6, wherein the receiving the first notification information includes receiving:

reason information based on which the terminal device determines to process an uplink traffic flow by using a second processing method.

9. The method according to claim 8, wherein the determining, by the user plane network element, the processing method for the downlink traffic flow based on the first notification information, includes:

determining, by the user plane network element, the processing method for the downlink traffic flow based on the reason information and the second indication information.

10. The method according to claim 6, wherein the receiving the first notification information further includes receiving:

description information and steering information of an uplink traffic flow corresponding to the downlink traffic flow; or flow description information and steering information of the downlink traffic flow.

11. The method according to claim 10, wherein the determining, by user plane network element, the processing method for the downlink traffic flow based on the first notification information, includes:

determining, by the user plane network element, the processing method for the downlink traffic flow based on the description information and the steering information of the uplink traffic flow or the flow description information and the steering information of the downlink traffic flow.

12. The method according to claim 6, wherein the determining, by the user plane network element based on the first notification information, to process the downlink traffic flow by using a third processing method includes determining a priority of the third processing method is higher than that of the fourth processing method.

13. The method according to claim 6, wherein the method further comprises:

determining, by the user plane network element, second duration information for using the third processing method.

14. The method according to claim 13, wherein the determining second duration information for using the third processing method includes:

determining, by the user plane network element, the second duration information based on the first duration information.

15. The method according to claim 6, wherein the receiving the first notification information further include receiving:

first duration information in which the terminal device determines that the second processing method is valid.

16. A traffic flow processing apparatus, comprising:

a transceiver, a memory storing a program;

one or more processors, coupled to the memory and the transceiver, wherein the one or more processors are configured to execute the program to perform operations for:

receiving first policy information from a session management network element, wherein the first policy information comprises a first processing method for an uplink traffic flow;

in response to the apparatus meeting a first condition, determining a second processing method for the uplink traffic flow; and sending first notification information via the transceiver to a user plane network element, wherein the first notification information is for notifying the user plane network element to determine a processing method for a downlink traffic flow corresponding to the uplink traffic flow;

in response to the apparatus meeting a second condition, determining to process the uplink traffic flow by using the first processing method; and sending third notification information to the user plane network element, to notify that the apparatus processes the uplink traffic flow by using the first processing method.

* * * * *